United States Patent
Baker

(10) Patent No.: US 6,546,417 B1
(45) Date of Patent: Apr. 8, 2003

(54) ENHANCED ELECTRONIC MAIL SYSTEM INCLUDING METHODS AND APPARATUS FOR IDENTIFYING MIME TYPES AND FOR DISPLAYING DIFFERENT ICONS

(75) Inventor: Michelle Baker, New York, NY (US)

(73) Assignee: Intellinet, Inc., New York, NY (US)

( * ) Notice: Subject to any disclaimer, the term of this patent is extended or adjusted under 35 U.S.C. 154(b) by 0 days.

(21) Appl. No.: 09/604,426

(22) Filed: Jun. 27, 2000

Related U.S. Application Data

(63) Continuation-in-part of application No. 09/209,162, filed on Dec. 10, 1998.

(51) Int. Cl.[7] .............................. G06F 15/16; G06F 3/00
(52) U.S. Cl. ........................................ 709/206; 345/835
(58) Field of Search ................................ 709/206, 232, 709/207; 345/700, 839, 835, 752, 738; 207/10

(56) References Cited

U.S. PATENT DOCUMENTS

| | | | |
|---|---|---|---|
| 5,452,289 A | 9/1995 | Sharma et al. ............. 370/32.1 |
| 5,680,558 A * | 10/1997 | Hatanaka et al. ........... 345/839 |
| 5,706,434 A | 1/1998 | Kremen et al. ........ 395/200.09 |
| 5,734,901 A * | 3/1998 | Sidhu et al. ................ 712/220 |
| 5,752,059 A * | 5/1998 | Holleran et al. ........... 709/206 |
| 5,796,394 A * | 8/1998 | Wicks et al. ................ 345/751 |
| 5,805,811 A | 9/1998 | Pratt et al. ............. 395/200.36 |
| 5,818,447 A | 10/1998 | Wolf et al. ................. 345/335 |
| 5,826,062 A * | 10/1998 | Fake, Jr. et al. ............ 709/206 |
| 5,826,269 A | 10/1998 | Hussey ........................ 707/10 |
| 5,867,281 A * | 2/1999 | Nozoe et al. ............... 358/402 |
| 5,889,518 A | 3/1999 | Poreh et al. ................ 345/340 |
| 5,890,130 A | 3/1999 | Suzuki et al. ................. 705/27 |
| 5,906,656 A | 5/1999 | Keller et al. ................ 709/200 |
| 5,917,489 A * | 6/1999 | Thurlow et al. ............ 345/347 |
| 5,956,486 A | 9/1999 | Hickman et al. ...... 395/200.36 |
| 5,974,449 A | 10/1999 | Chang et al. ............... 709/206 |
| 5,995,756 A | 11/1999 | Hermann .................... 395/712 |
| 6,014,688 A | 1/2000 | Venkatraman .............. 709/206 |
| 6,073,166 A * | 6/2000 | Forsen ........................ 709/206 |
| 6,088,696 A * | 7/2000 | Moon et al. .................. 707/10 |
| 6,249,807 B1 * | 1/2001 | Shaw et al. ................. 709/206 |

OTHER PUBLICATIONS

"Eudora extended message Services API Version 3", Lundblade and Blumin, QUALCOMMIncorporated, 1996.

(List continued on next page.)

Primary Examiner—Moustafa M. Meky
Assistant Examiner—Abdullahi E. Salad
(74) Attorney, Agent, or Firm—David P. Gordon; David S. Jacobson; Thomas A. Gallagher

(57) ABSTRACT

Electronic mail client software has a mailbox displayer which lists messages together with an icon for each message where the icon is associated with the MIME type of the message. Mail which contains a file attachment is listed in the inbox with an icon indicative of the type of file attached to the email. The mailbox displayer interprets the MIME type and selects the appropriate icon either from the icon registry in the OS or from a directory of icons maintained by the email client software. The mailbox displayer component preferably includes all of the functionality of state-of-the-art mailbox displayers and includes the functionality of looking to a directory of icons for display with information about the message based on the MIME type and subtype of the message. If there is no appropriate icon in the directory of icons, the mailbox displayer uses icon image data contained in a subpart of the MIME message if it is available. Otherwise, no icon or a generic icon is used. According to the presently preferred embodiment, a type table is maintained by a type updater component. The type table includes a list of message types and subtypes together with filenames of scalable icons to be used by the mailbox displayer.

20 Claims, 19 Drawing Sheets

U.S. PATENT DOCUMENTS

| | | | |
|---|---|---|---|
| 6,189,026 B1 * | 2/2001 | Birrell et al. | 709/206 |
| 6,192,396 B1 * | 2/2001 | Koher | 709/206 |
| 6,205,432 B1 * | 3/2001 | Gabbard et al. | 705/14 |
| 6,360,252 B1 * | 3/2002 | Rudy et al. | 709/206 |

OTHER PUBLICATIONS

"Surf Monkey –Email",:web site: at http://www.surfmonkey.com/quick_tour/qt_email.html, 1998.

"Sony Post Pet", at website: http://www.sony.com.sg/postpet/ 1998.

"Guide to Software for Email Correspondence Chess" by John H. Mongle, Feb. 1, 1998, at website:http:/www.chessmail.com/mongle.htm.

Internet site from iT Knowledge.Com, selections of chapters relating to Outlook Express Mail from "Internet Explorer 4 6–IN–1" by Hemming, MacMillan Computer Publishing, Part III, 18 pages, downloaded from the Internet, Feb. 25, 2000.

Internet site from iT Knowledge.Com, selections of chapters relating to Netscape Messenger from "Netscape Communicator 6–in–1" by Guilford, MacMillan Computer Publishing, Part III, 12 pages, downloaded from the Internet, Feb. 25, 2000.

* cited by examiner

| FIG.6a-1 |
| FIG.6a-2 |

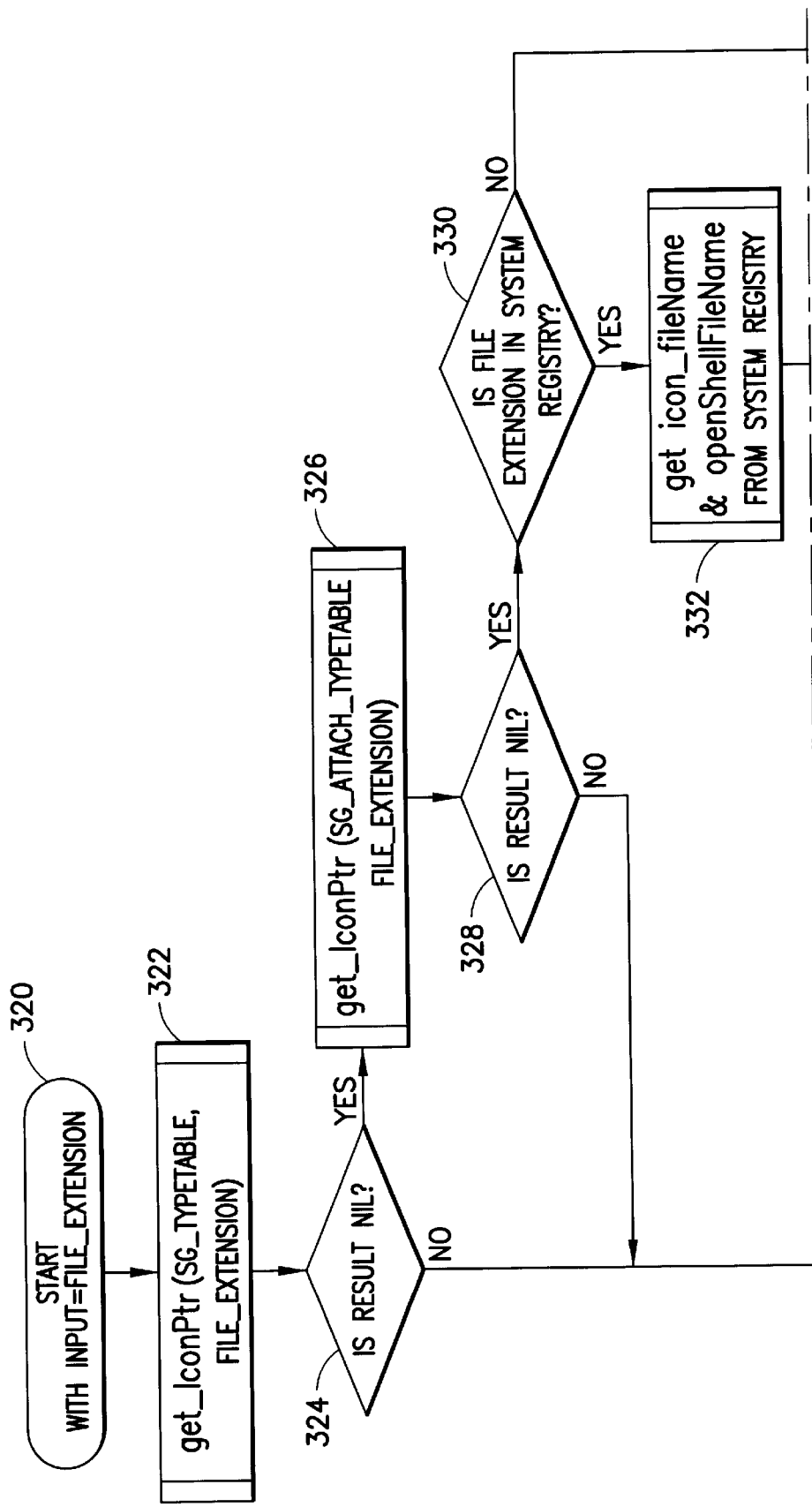

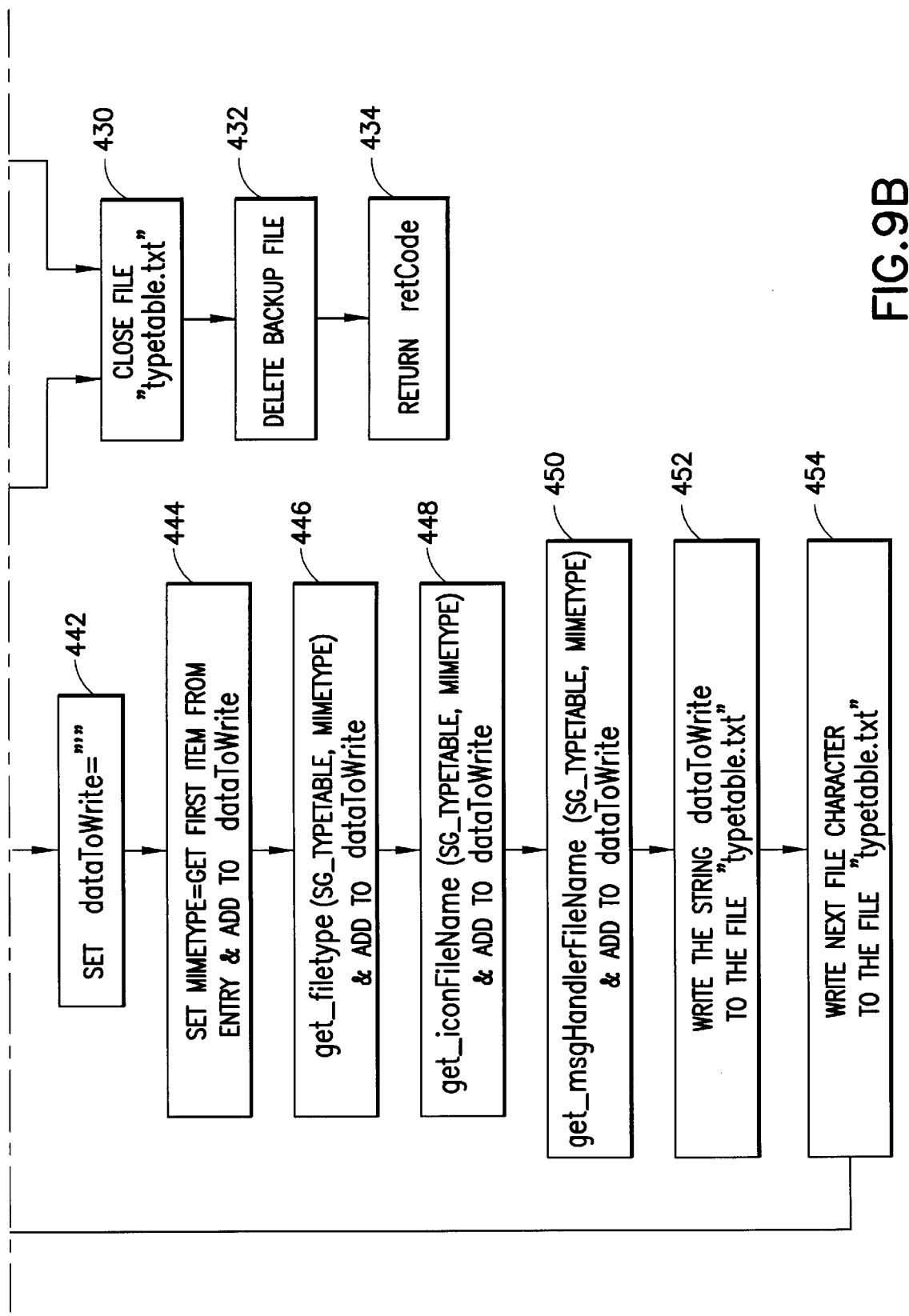

ENHANCED ELECTRONIC MAIL SYSTEM INCLUDING METHODS AND APPARATUS FOR IDENTIFYING MIME TYPES AND FOR DISPLAYING DIFFERENT ICONS

This application is a continuation-in-part of application Ser. No. 09/209,162 filed Dec. 10, 1998 still pending, the complete disclosure of which is hereby incorporated by reference herein. This application is related to copending application Ser. No. 09/604,428 filed simultaneously herewith still pending, the complete disclosure of which is also hereby incorporated by reference herein.

This invention was made with Government support under SBIR Grants Nos. 9561725 and 9710619 awarded by the National Science Foundation. The Government has certain rights in this invention.

BACKGROUND OF THE INVENTION

1. Field of the Invention

The invention relates to an electronic mail program. More particularly, the invention relates to an electronic mail program having a mailbox browser display which displays different icons for different types of mail item MIME types.

2. State of the Art

In recent years electronic mail ("email") has become widely used in business, education, and in personal communications. One of the features of electronic mail which is most convenient, particularly in business and in education, is the ability to attach a binary computer file to an email message. This feature enables email correspondents to rapidly share word processing documents, database documents, spreadsheet documents, multimedia documents, or virtually any kind of binary file created by a computer. There are, however, some serious limitations and inconveniences associated with attaching a binary file to an email message.

The original Internet mail system as defined in 1982 with RFC (Request for Comments) 821 and 822 had a number of important limitations. In particular, the system was not designed to carry large quantities of arbitrary data in an email message. In fact, the 1982 SMTP (Simple Mail Transport Protocol) standard required that an email message consist of a single message containing only ASCII characters in lines of 1000 characters (blocks of 32 k) or less.

The ability to send binary data through the Internet electronic mail system was made possible with the MIME (Multipurpose Internet Mail Extensions) standard for Internet messages. The original MIME standard was published as an Internet Request For Comments document (RFC 1341) and approved in June of 1992. (See Internet RFCs 2045, 2046, and 2047 for the latest MIME standards documents.) The MIME standard describes how an email message should be formatted in order to be considered MIME compliant. MIME defines a set of message header fields and a set of message encoding standards that are designed to overcome the limitations of RFC 822 message formats and still be transportable through any of the numerous legacy mail transport systems in use on the Internet. (See specifically, N. Freed and N. Borenstein, *Multipurpose Internet Mail Extensions (MIME) Part 1: Format of Message Bodies,* Network Working Group, Request For Comments (RFC 2045) November 1996.) MIME message header fields extend those defined in RFC 822 and describe the content and encoding type of the email message. Encoding schemes allowed in the MIME standard include "quoted-printable", and "base64". In addition, three unencoded data types are allowed. These are labeled "8 bit", "7 bit", or "binary". It should be noted that legacy gateways still do not handle binary data and nearly all MIME compliant messages encode binary data as "7 bit", the default encoding for MIME.

Today MIME is implemented in all of the major electronic mail clients or "User Agents", e.g. Microsoft Outlook and Outlook Express, Netscape Communicator, and Qualcomm Eudora. However, only a few MIME types including "text/plain", "text/html", "multipart/alternative", and "multipart/mixed" can be handled by these programs. Probably the most important feature of the MIME standard that was that it allowed any binary data to be appropriately encoded and sent through the older SMTP system of mail gateways and exchanges. Mail client programs such as those listed above were modified to allow users to attach any type of file to a mail message. This was done by (a) including an appropriate encoding module to translate the binary data of an arbitrary file to an acceptable MIME encoding such as "7 bit" or "base64", (b) expanding the Mail client's ability to handle messages with a MIME type set to "multipart", and (c) including the file specified by a user as a part of the "multipart" message. For many years, mail client programs offered users only the two choices; they could send a simple text message (sent with "content-type=text/plain") or they could attach any file to a simple text message (sent with "content-type=multipart/mixed").

More recently the programs listed above have been extended to allow authors to use basic types of text formatting such as alternative fonts and styles by including these features in the mail client text editor and sending the message with a MIME type set to "text/html". Today Microsoft's Outlook even allows a person to use Word, a full featured text editor, to author electronic mail messages by converting the Word file format to HTML before manually inserting it into the body of the mail message for sending. Nevertheless, mail client programs still rely exclusively on file attachments with message MIME types set to "multipart" for any other type of file format.

If the sender and the receiver of the email message with the attached binary file are using the same brand and version of email program and both programs are configured in substantially the same way, the receiver's email program should automatically apply the appropriate decoding to the attached binary file and produce a file which is identical to the file which was attached to the email by the sender. However, if the sender and receiver are using different email programs, the recipient may receive a file which must be decoded by the recipient using a separate decoding program.

Even after the file is properly received and decoded, it is often difficult for the receiver of the file to open the file. The receiver of the file might expect that "clicking" on the file icon will open the file. However, clicking on the file icon will often not open the file. It may result in an error message like "application not found" or, worse, it may result in the file being opened by an inappropriate application thereby displaying "gibberish". The receiver of the file must have a program capable of reading (opening) the file. For example, if one attaches a spreadsheet file to an email message, the receiver of the file must have a spreadsheet program in order to open the file. Technically, it is not necessary that the receiver of the file have the same brand program as that which created the file. However, opening a file with a program which did not create it, though possible, can be very inconvenient. The receiver of the file must know what kind of file is attached to the email message, must know what program on their computer is capable of reading that type of file, must launch the program, must open the file from within the program, and wait while the program translates the file.

The limitations of Internet electronic mail can become even more frustrating if the sender and recipient are not using the same operating system (OS). Some mail attachment encoding schemes (and file compression schemes) are OS-dependent and it is possible that an email recipient could receive a file which is impossible to decode (or decompress).

These limitations in electronic mail have discouraged many people, particularly non-sophisticated computer users, from attaching files to electronic mail messages. In fact, for some novice users, the task of launching one application to create a document, saving the document, launching a separate email application to create an email message, and then locating the saved document for attachment to an email message is daunting enough to discourage them. In addition, novice users often complain that after "downloading" a file attached to an email message they cannot find the file on their hard disk.

Most email client software allows the user to sort items in the inbox by sender, subject, or date in order to locate more easily a particular mail item. In addition, most email client software indicates whether a particular message includes an attached file. This is indicated by an icon such as a paper clip icon or a generic document icon or a floppy disk icon, for example. However, the same icon is used regardless of the nature of the attachment and there is no way of knowing the nature of the attachment until the message is opened. Prior art FIG. 1 shows an example of a typical email inbox where some of the mail items have attached files indicated by the paper clip icon to the left of the subject name. Though not specifically shown in FIG. 1, those skilled in the art will appreciate that generic icons, such as !, ✔, →, ✔, etc., may also be displayed alongside the message subject to indicate various "properties" of the message, such as whether it is a high priority message, whether you have already replied to the message, etc. These generic icons are usually monochromatic font characters taken from a "dingbats" font or the like.

In the most recent versions of the major email client programs, an icon that represents the file type of an attached file is displayed in the body of the mail message after the message is opened by the user. This is possible because computer operating systems such as Microsoft Windows or Macintosh OS maintain data that associates information with each file type known to the system. This information includes a graphical icon and the location of programs that may be used to "open", "edit", or to perform a handful of other actions on the file. For example, in Microsoft Windows the system registry includes entries for each file type that is known to the system and at least some of the information described above is associated with the file type. When a user opens an electronic mail message with "content-type= multipart/mixed", a mail client program built for Microsoft Windows (e.g. Microsoft Outlook) determines that the second part of the message was an attached file, identifies a line of text within the message such as, Attachment Converted: "c:\attach\aFile.doc", looks in the system registry for the icon associated with the file type ".doc", and displays the graphical icon inside the body of the message.

In current systems, MIME type is not used to associate icons to files, rather the file type extension is used. This creates important limitations in the ability to associate different versions of software or documents created by different versions of the software with different icons. For example all documents created by MS Word, regardless of which-version of Word was used, have the same file type (file extension) and as a result are associated with the same icon. This is true even though many newer versions of the files cannot be read by older versions of the software.

My previously incorporated parent application discloses electronic mail software which includes a main email component and a number of installable components. The installable components include authoring/reading components for creating/reading different kinds of documents and mailbox components for listing different kinds of messages or for listing messages in different styles. The main email component provides an underlying graphical user interface for functions directly associated with the storage and transfer of electronic mail messages, and also handles all data bundling and unbundling required to transform a message created by an authoring component into a MIME compliant message. The authoring/reading components act like applications embedded within the email program and allow specific types of documents such as spreadsheets, graphics, databases, etc. to be created from within the email program and emailed directly. The authoring/reading components also allow received documents to be read without the difficulties traditionally associated with attaching binary files to an email letter. The authoring components of the invention pass data to the main email component which packages the data as a MIME compliant message. When the message is received, the main email component concatenates (as needed) and decodes the MIME message and sends the data to the authoring/reading component associated with the MIME type.

My previously incorporated parent application broadly disclosed and claimed mailbox handling software whereby messages of different types are displayed in different ways in a mailbox listing within the context of the modular component email software.

It is believed that certain features disclosed in my parent application are applicable to any email client software and may be used to improve the process of attaching files to email and using files attached to email.

SUMMARY OF THE INVENTION

It is therefore an object of the invention to provide an electronic mail program which includes an inbox list whereby different kinds of messages and attached documents are displayed with different kinds of icons.

In accord with this object which will be discussed in detail below, electronic mail client software according to the invention has a mailbox displayer which lists messages together with an icon for each message where the icon is associated with the MIME type of the message. Mail which contains a file attachment is listed in the inbox with an icon indicative of the type of file attached to the email. The mailbox displayer interprets the MIME type and selects the appropriate icon either from the icon registry in the OS or from a directory of icons maintained by the email client software. For example, if an email with an ADOBE ACROBAT file attachment is received, the ADOBE ACROBAT icon will appear in the mailbox listing alongside the mail item listing. In addition, if a message is created with a special authoring/reading component as described in my parent application, the icon associated with the authoring/reading component will be displayed in the mailbox listing as part of the line displaying the mail item.

The electronic mail software of the present invention is described by example with reference to the email software of my parent application which includes a main email component and a number of installable components which communicate bidirectionally with the email component through an application programming interface (API). The installable components include authoring/reading components as well as a mailbox displayer component. According to the presently preferred embodiment, a component is also included for maintaining a database of icons.

The mailbox displayer component functionality is invoked by the user when the mailbox is opened, when the list of mail is scrolled, etc. The mailbox displayer component preferably includes all of the functionality of state-of-the-art mailbox displayers and includes the functionality of looking to a directory of icons for display with information about the message based on the MIME type of the message. In the Lingo embodiment, a data structure is created for each message with an additional TYPE field that is based on the MIME type and subtype of the message. The internal TYPE field is used to associate MIME types to icons. Another embodiment uses the contents of "content-type" (MIME type) header of the message directly to associate with icon images. If there is no appropriate icon in the directory of icons, the mailbox displayer uses icon image data contained in a subpart of the MIME message if it is available. Otherwise, no icon or a generic icon is used. According to the presently preferred embodiment, a type table is maintained by a type updater component. The type table includes a list of message types and subtypes together with filenames of scalable icons to be used by the mailbox displayer. The invention prefers scalable icons so that the icon can be sized to accompany the font size chosen to display the mailbox contents.

Several embodiments of the type updater component are provided. According to the first embodiment, icons are installed/removed manually by the user. According to a second embodiment, icons are automatically installed/removed when modular authoring/reading components are installed/removed. According to a third embodiment, new icons are added automatically whenever a new message type is encountered by the mailbox displayer. The new icon is retrieved from either the operating system registry or from the icon image data embedded in the message. According to a fourth embodiment, the type updater automatically queries a network server for new icon information and downloads icon image data as needed.

Additional objects and advantages of the invention will become apparent to those skilled in the art upon reference to the detailed description taken in conjunction with the provided figures.

BRIEF DESCRIPTION OF THE APPENDICES

Appendix A is a program listing for MACROMEDIA DIRECTOR of a mailbox displayer according to the invention; and Appendix B is a program listing for MACROMEDIA DIRECTOR of a type updater according to the invention.

DETAILED DESCRIPTION OF THE PREFERRED EMBODIMENTS

Figure 1:
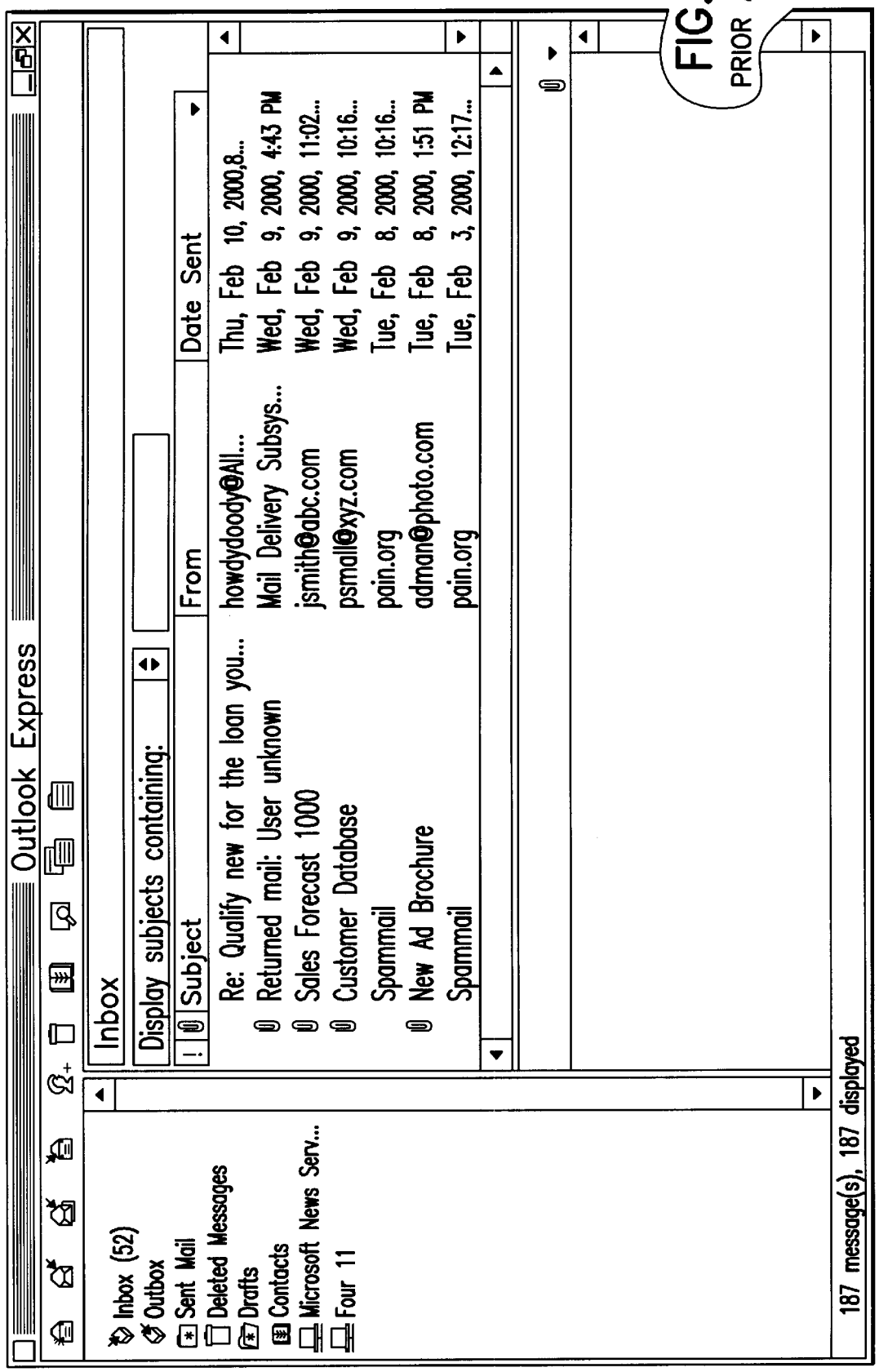
FIG. 1 is a screen shot of a prior art electronic mailbox displayer.
Figure 2:
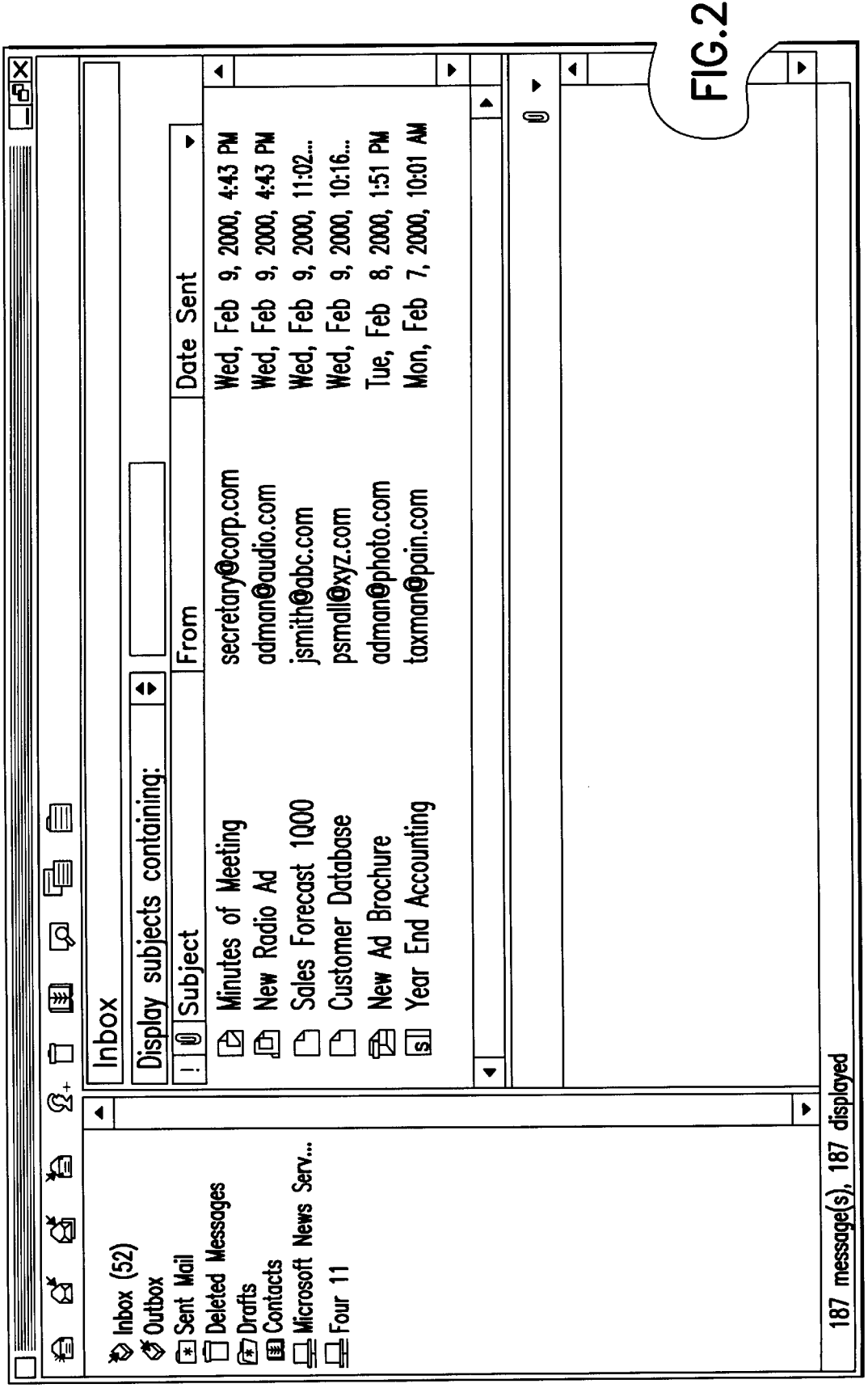
FIG. 2 is a screen shot of an electronic mailbox displayer according to the invention.

Referring now to FIG. 2, electronic mail client software according to the invention has a mailbox displayer which lists messages together with an icon for each message where the icon is associated with the MIME type of the message. Mail which contains a file attachment is listed in the inbox with an icon indicative of the type of file attached to the email. For example, as shown in FIG. 2, the mail message entitled "Minutes of Meeting" is listed with a MICROSOFT WORD icon indicating that the email message has a WORD file attached to it. The message entitled "New Radio Ad" is listed with a QUICKTIME WAV icon indicating that an audio file is attached to the email. The message entitled "New Ad Brochure" has an attached ADOBE ACROBAT file as indicated by the ACROBAT icon. Similarly, the message "Sales Forecast" is displayed with an EXCEL spreadsheet icon; the "Customer Database" message is displayed with a FILEMAKER PRO database icon; and the message "Year End Accounting" is displayed with a QUICKEN icon. According to the invention, the mailbox displayer interprets the MIME type of the message and/or the MIME type or document type of the attachment, if any, and selects the appropriate icon either from the icon registry in the OS or from a directory of icons maintained by the email client software.

Figure 2A:
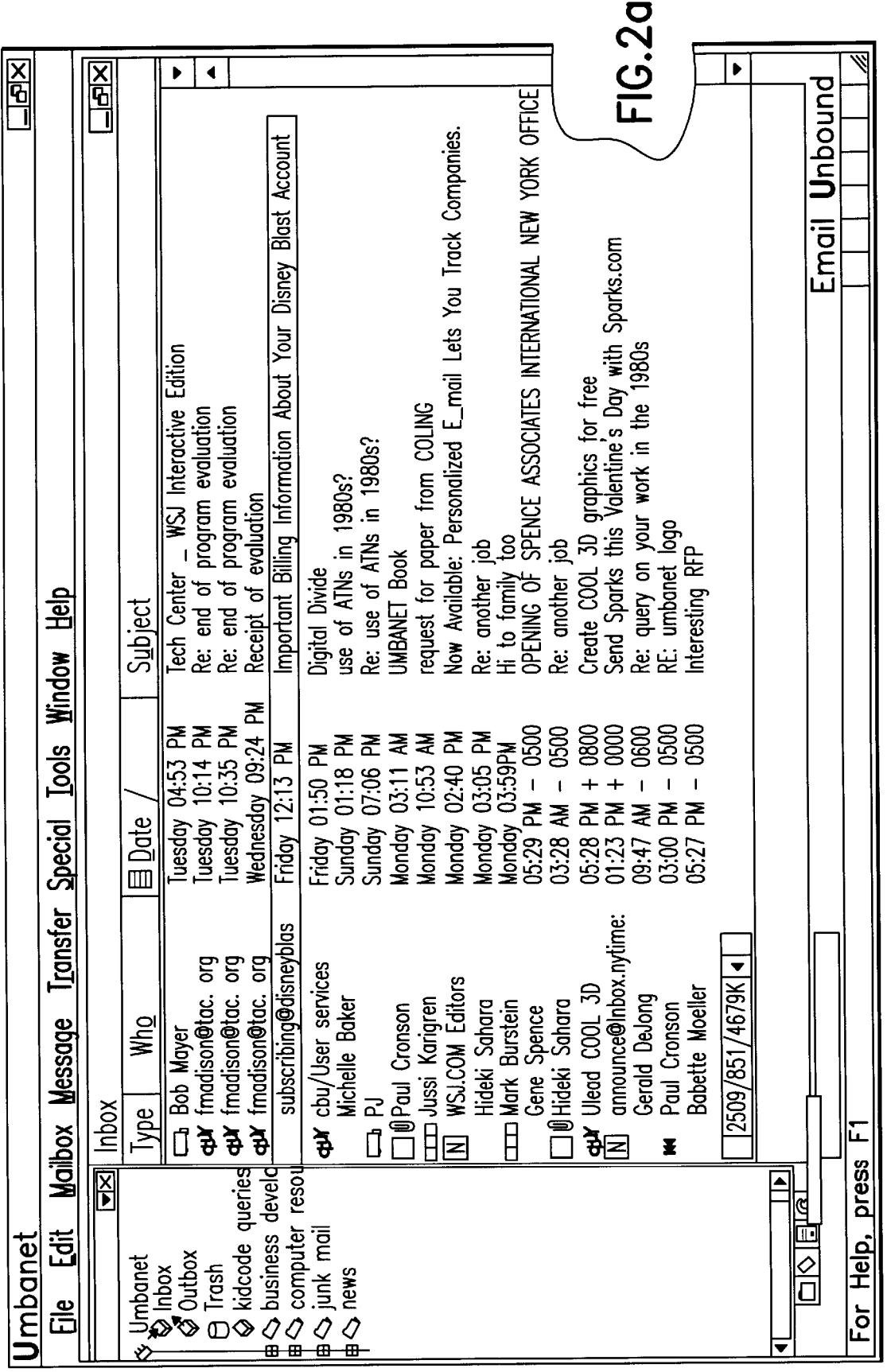
FIG. 2a is a screen shot of an electronic mailbox displayer according to an alternate embodiment of the invention.

The electronic mail software of the present invention is described by example with reference to the email software of my previously incorporated parent application which includes a main email component and a number of installable components which communicate bidirectionally with the email component through an application programming interface (API). The installable components include authoring/reading components as well as at least one mailbox displayer component. FIG. 2a illustrates an embodiment of the email software of my previously incorporated parent application which displays an icon indicative of the authoring/reading component associated with the mail message. This embodiment is also capable of receiving email from (and sending email to) prior art email clients. FIG. 2a illustrates a mailbox list where two mail items are shown with two icons, i.e. a paper clip and an ACROBAT icon and a paper clip and a PHOTOSHOP icon. The dual icon display indicates that the mail was created without any special authoring/reading component and has an attachment created by some other program, in this case ACROBAT and PHOTOSHOP.

Figure 3:
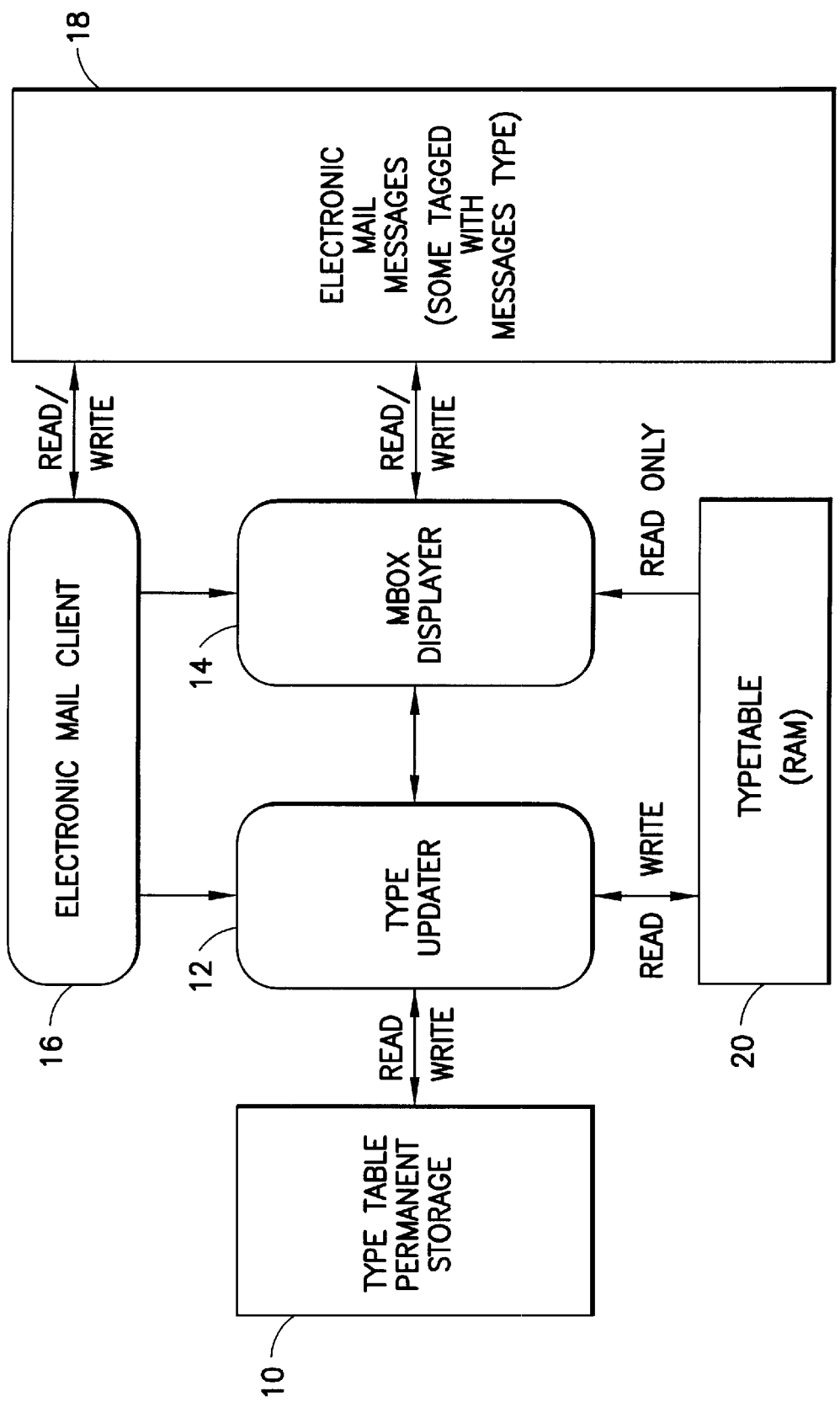
FIG. 3 is a block diagram of the component organization of an electronic mail client according to the invention.

As mentioned above, the electronic mail software of the present invention is described by example with reference to the email software of my previously incorporated parent application which includes a main email component and a number of installable components. According to the presently preferred embodiment, a component is also included for maintaining a database of icons. FIG. 3 illustrates the relationship between these components.

As shown in FIG. 3, a data structure 10 referred to as TYPETABLE is created and maintained by a component 12 referred to as TYPE_UPDATER. A working example of a TYPE_UPDATER according to the invention is illustrated in Appendix B which is described in more detail below. The primary purpose of the TYPETABLE is to be read by the MBOX_DISPLAYER component 14. The TYPE_UPDATER 12 and. MBOX_DISPLAYER 14 communicate with each other using function calls and a shared data structure, TYPETABLE. For example, the MBOX_DISPLAYER includes a call to the function "initialize TYPETABLE" (306, FIG. 6a) inside the TYPE_UPDATER component. The MBOX_DISPLAYER communicates with the electronic mail client software using the API described in the parent application and or in previously incorporated Ser. No. 09/604,428, still pending. As shown in FIG. 3 the MBOX_DISPLAYER component 14 and the electronic mail client software 16 also have bidirectional access to the store of electronic mail messages in the user's mail boxes. According to the presently preferred embodiment, the electronic mail messages are stored with an optional TYPE field which includes information drawn from the MIME type and subtype header fields of the message if the message is created by an installable application component of the kind described in the parent application.

The MBOX_DISPLAYER component functionality is invoked by the user when a mailbox is opened, when the list of mail is scrolled, etc. Those skilled in the art will appreciate that most electronic mail client software provides a number of different mailboxes such as inbox, outbox, read mail, sent mail, etc. The MBOX_DISPLAYER component 14 preferably includes all of the functionality of state-of-the-art mailbox displayers and also includes the functionality of looking to the TYPETABLE (and as explained in more detail below, to look into the body of a MIME message) to find an appropriate icon for display alongside a message title in the mailbox display. According to the presently preferred embodiment, icons are stored as small image files, e.g. EPS files or GIF files, and are pointed to by the TYPETABLE data structure. In order to accommodate the use of different size fonts in the mailbox display, means for scaling the size of the icon graphics are also provided. Three methods may be used. First, the image may be scaled using a standard interpolation algorithm. Second, multiple copies of icon images with different resolutions may be stored and retrieved to match a limited number of font point sizes. Third, and presently preferred, a combination of the first two methods is used whereby at least one image for each icon is stored, the icon most closely matching the point size of the font is chosen and then scaled as needed to better match the font point size.

Table 1 illustrates how the TYPETABLE data is stored in permanent storage (e.g. hard disk).

TABLE 1

| mimetype | icon filename | msg handler filename |
|---|---|---|
| text/plain | c: \kidcode\text.gif | c: \kidcode\txt.dxr |
| x-application/rebus | c: \kidcode\rebus.gif | c: \kidcode\rebus.dxr |
| x-application/grid | c: \kidcode\grid.gif | c: \kidcode\grid.dxr |
| x-application/graph | c: \kidcode\graph.gif | c: \kidcode\grph.dxr |
| ... | ... | ... |
| multipart/mixed | c: \kidcode\paperclip.gif | |

Table 1 illustrates at least five mimetypes. The first four are mimetypes which utilize installable components for authoring/reading. The installable components are indicated by the ".dxr" file extension. The multipart/mixed (fifth) mimetype illustrated in Table 1 indicates an attachment created with an external application rather than an installable component. As mentioned above with reference to FIG. 2a, a generic paper clip icon is used to distinguish this attachment from mail messages created with installable components.

Table 2 illustrates the typetable data structure as it is loaded into RAM.

TABLE 2

| mimetype | ptr | icon filename | msg handler filename |
|---|---|---|---|
| text/plain | 20 | c: \kidcode\text.gif | c: \kidcode\txt.dxr |
| x-application/rebus | 21 | c: \kidcode\rebus.gif | c: \kidcode\rebus.dxr |
| x-application/grid | 22 | c: \kidcode\grid.gif | c: \kidcode\grid.dxr |
| x-application/graph | 23 | c: \kidcode\graph.gif | c: \kidcode\grph.dxr |
| ... | | ... | ... |
| multipart/mixed | 19 | c: \kidcode\paperclip.gif | |

When the data structure TYPETABLE is loaded into RAM it is referred to as SG_TYPETABLE and has a structure as shown in Table 2. This structure includes a pointer to the icon. The pointer in the exemplary embodiment is a LINGO castmember.

Figure 6:
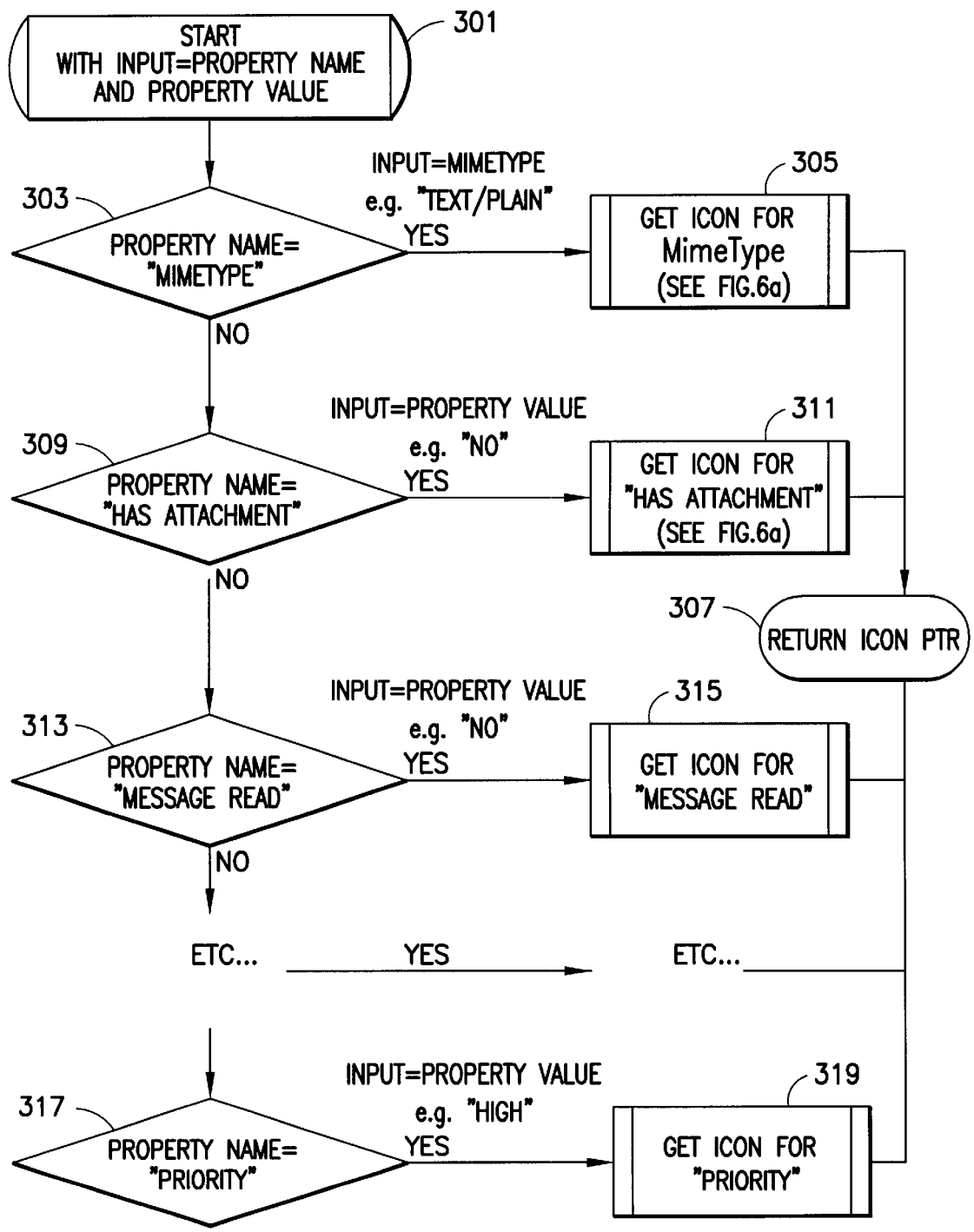
FIG. 6 is a simplified flow chart illustrating icon lookup for different mail item properties.
Figures 1, 6A:
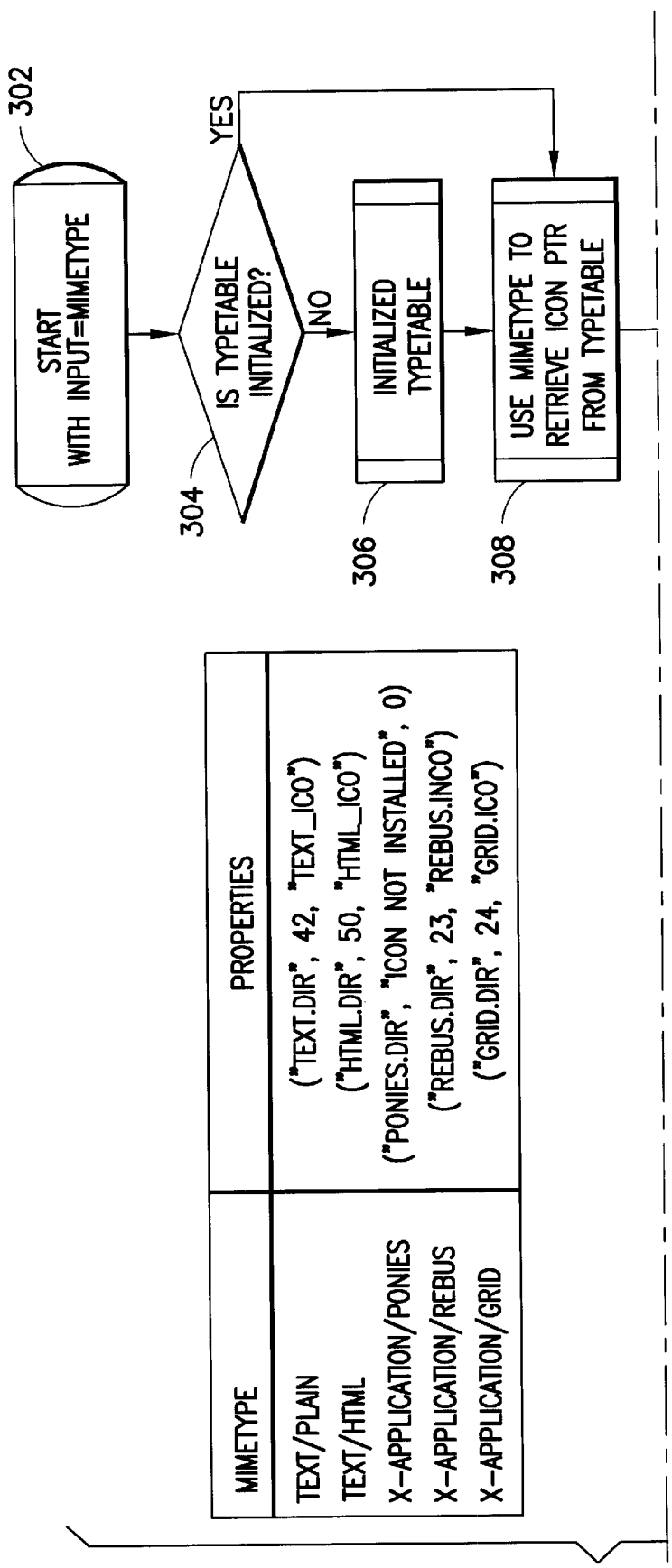
FIGS. 6a, 6b are simplified flow chart illustrating icon lookup for MIME type.
Figures 2, 6A:
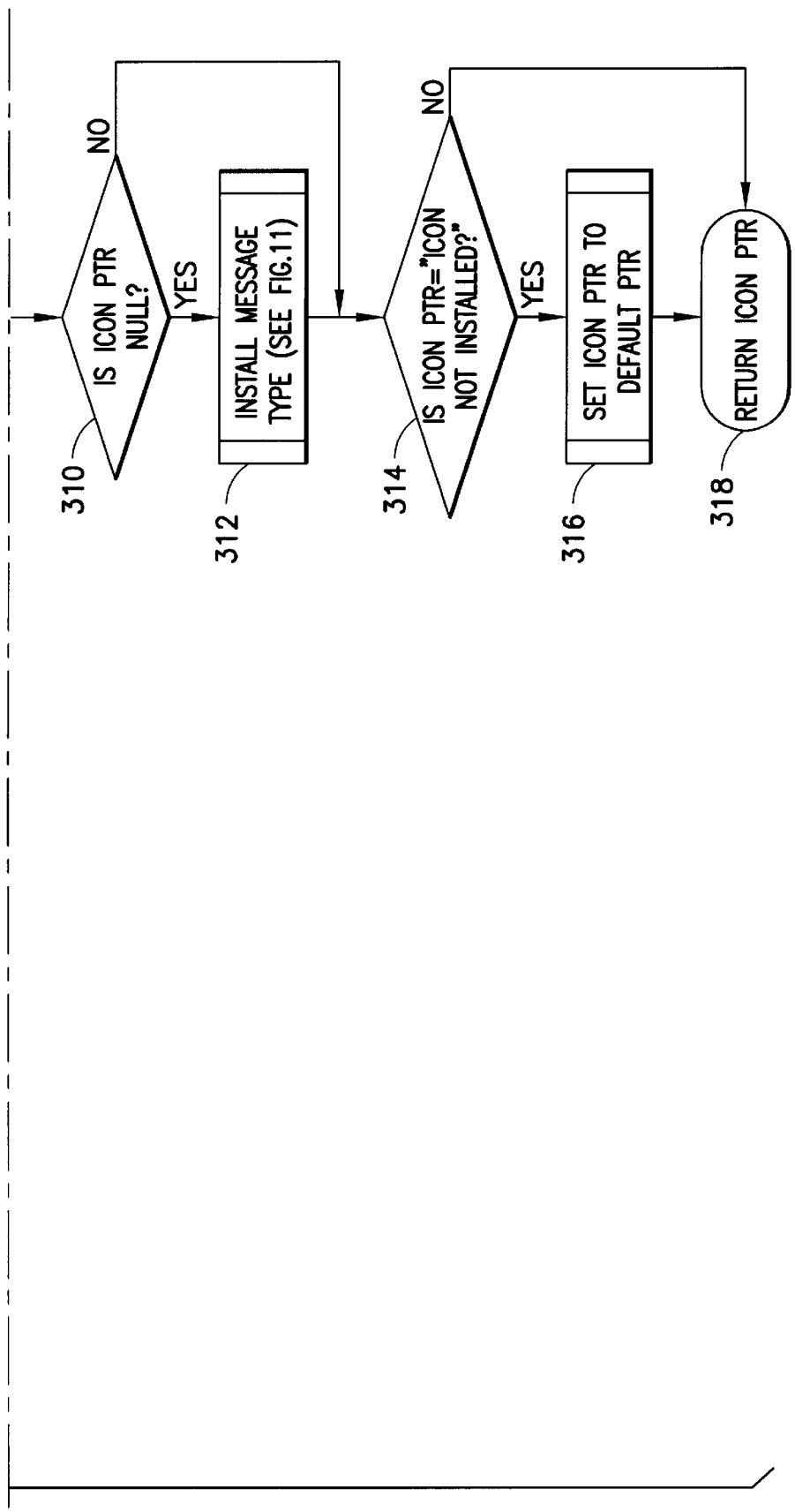
Figures 2, 6B:
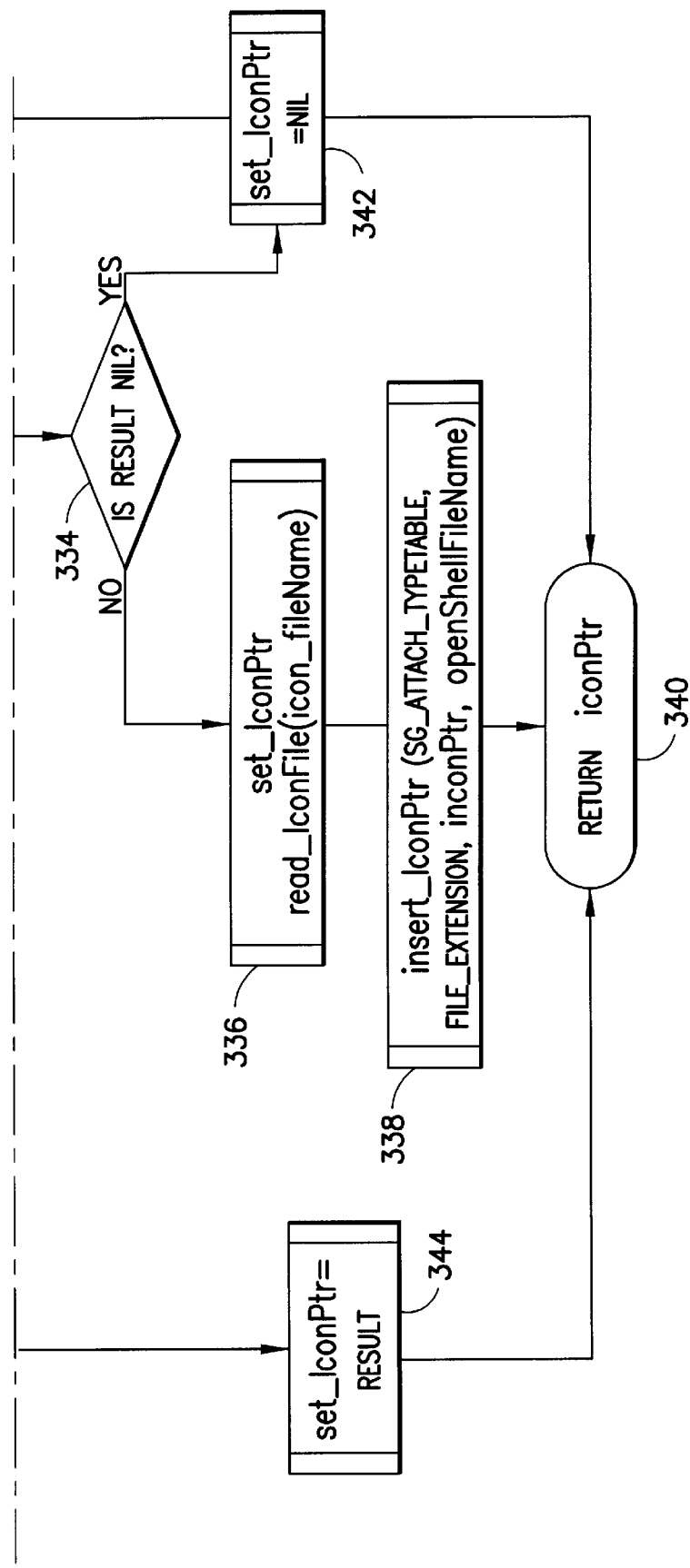

As mentioned above, according to the exemplary embodiment, when the email message has an attached file, a generic attachment icon is displayed and an icon particular to the attachment is also displayed. This second icon is pointed to by a data structure in RAM which is created on the fly (e.g. as illustrated in FIG. 6b) referred to as SG_ATTACH_TYPETABLE. The basic structure of SG_ATTACH_TYPETABLE is illustrated in Table 3.

TABLE 3

| File Extension | icon pointer | program filename |
|---|---|---|
| .doc | 30 | c: \programs\winword.exe |
| .pdf | 31 | c: \programs\acrobat.exe |
| .html | 32 | c: \programs\netscape.exe |
| .htm | 32 | c: \programs\netscape.exe |
| .xml | 32 | c: \programs\netscape.exe |
| ... | ... | ... |

As shown in Table 3, the file extension is associated with an icon pointer and the pathname to the program which will be used to read the attachment. As discussed in more detail below with reference to FIG. 6b, the SG_ATTACH_TYPETABLE is built on the fly using icons from the system registry.

Figure 4:
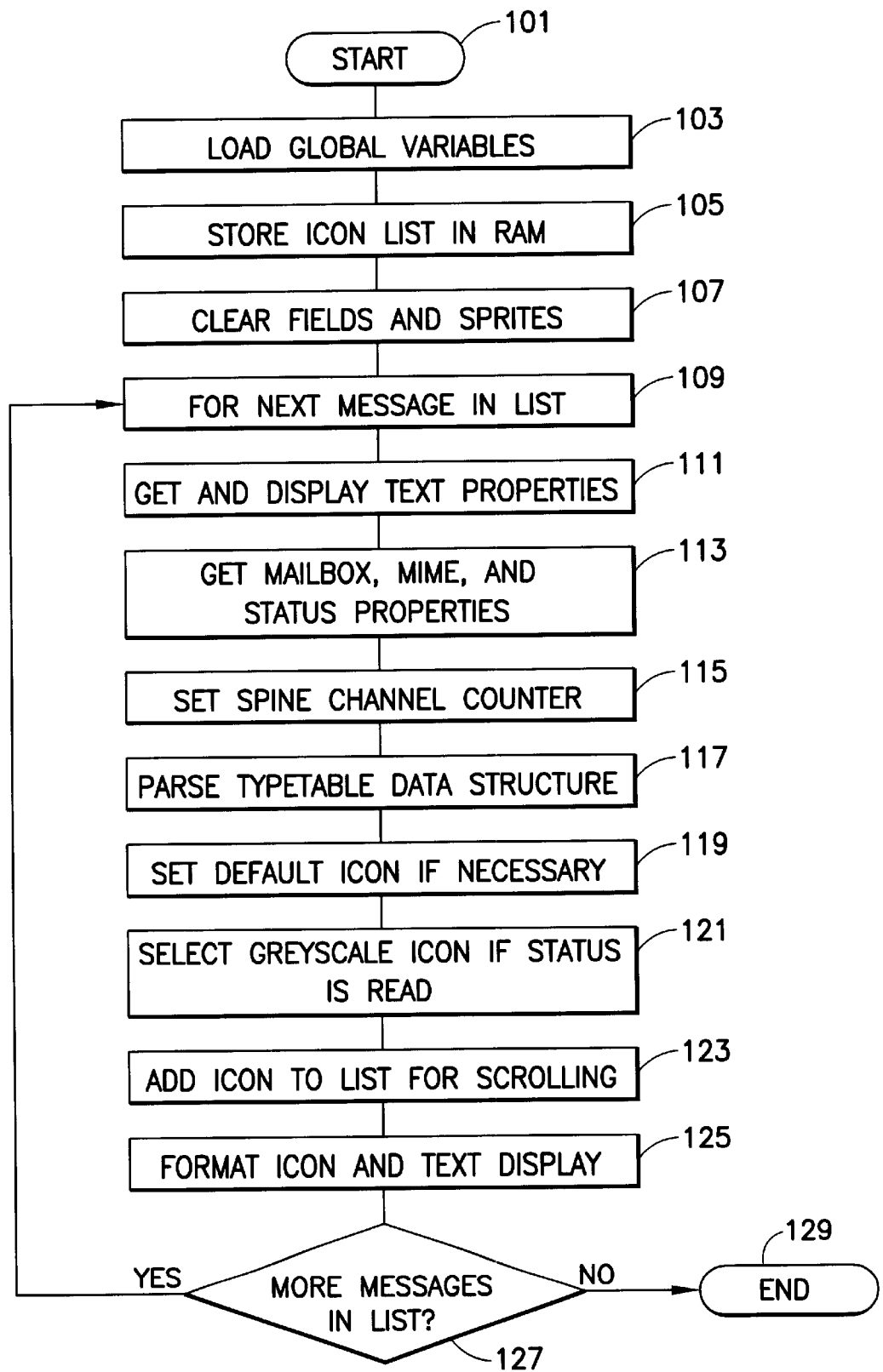
FIG. 4 is a simplified flow chart illustrating the basic operation of a mailbox displayer according to the invention.

A presently preferred embodiment of a MBOX_DISPLAYER component is presented in detail in Appendix A which is similar to Appendix B of my previously incorporated parent application. The code listing shown in Appendix A hereto differs from the code listing of the parent application starting at line 287 which is the start of the main mailbox display function. The main mailbox display function is also illustrated by the flowchart of FIG. 4 Referring now to FIG. 4 and Appendix A, the function starts at line 287 in Appendix A and at the START 101 in the flowchart of FIG. 4. Before displaying the mailbox contents, pointers to the TYPETABLE and associated system features are set up as illustrated at lines 293–300 in Appendix A and at 103, 105 in FIG. 4. The various mailbox fields, e.g. message number, subject, date, message read indicator, are cleared at lines 302–307 in Appendix A and at 107 in FIG. 4. "Sprite channels" (MACROMEDIA graphic holders) which will be used to display icon graphics are cleared at lines 309–311 in Appendix A and at 107 in FIG. 4. Next the message list is displayed starting at line 313 in Appendix A and at 109 in FIG. 4. The elements which make up each line of the mailbox display (e.g. the message subject, the date, the sender's name, as well as the graphical elements) are referred to as "properties". These properties are read from the message at lines 320–326 in Appendix A and at 111, 113 in FIG. 4. With the exception of mailbox, mimetype, and status, all of the properties are automatically displayed when read as illustrated at 111 in FIG. 4 and lines 320–323 in Appendix A. The mailbox, mimetype, and status properties are read at 113 in FIG. 4 and lines 324–326 in Appendix A. According to the presently preferred embodiment, the mimetype icon is also used to display message status. If the message has been read, the icon is displayed in greyscale. If the message has not been read, the icon is displayed in color. The steps of finding the icon and setting it to greyscale or color are illustrated at lines 328–355 of Appendix A. The sprite channel counter is set at lines 332–334 in Appendix A and at 115 in FIG. 4. The TYPETABLE data structure is parsed at lines 340–343 in Appendix A and at 117 in FIG. 4. If the TYPETABLE does not contain the icon indicated by the mimetype for this message, then a default icon is chosen at lines 344–346 in Appendix A and at 119 in FIG. 4. If the status for the message indicates that it (its attachment) has been read, then the greyscale version of the icon is set at lines 348–349 in Appendix A and at 121 in FIG. 4. The chosen icon is added to an icon list for rapid access during scrolling of the mailbox contents list. This is illustrated at lines 351–352 in Appendix A and at 123 in FIG. 4. The remainder of the main mailbox display function at lines 354–374 in Appendix A and at 125 in FIG. 4 concern locating the text and icons at appropriate screen locations. The code shown at lines 315–374 repeats for the number of messages in the mailbox as illustrated by the decision at 127 in FIG. 4. When there are no more messages to be listed, the main mailbox display function ends as illustrated at 376 in Appendix A and 129 in FIG. 4.

Though not presently illustrated in the code or flowchart, as mentioned above, if there is no appropriate icon in the directory of icons, the mailbox displayer uses icon image data contained in a subpart of the MIME message if it is available. Those skilled in the art will appreciate that this functionality is easily performed by reading the icon image data from the location in the MIME file which is defined by the standard(s) referenced above. Code to implement this might be inserted at line 325 of Appendix A or at line 345 of Appendix A.

Figure 5:
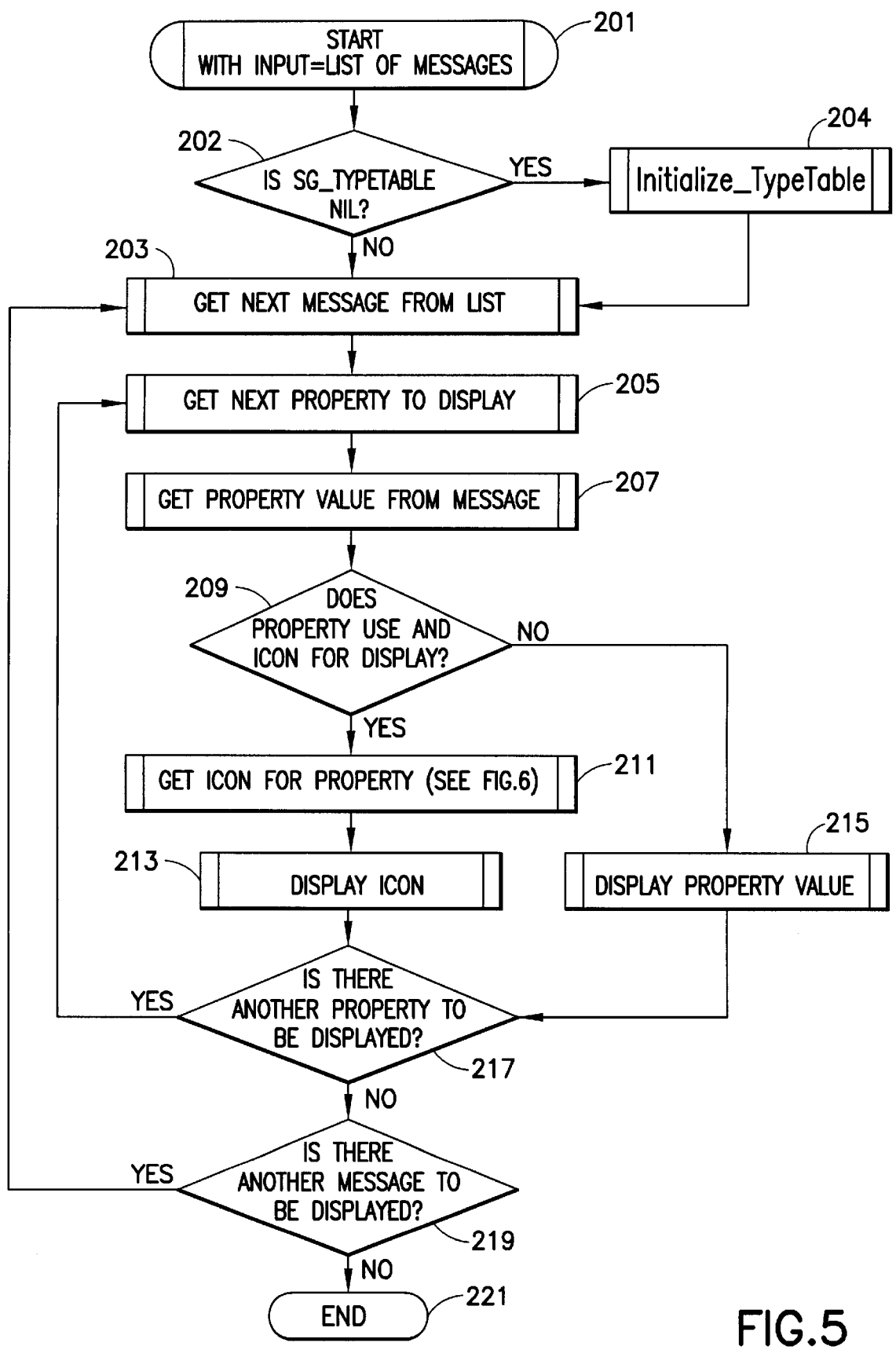
FIG. 5 is a simplified flow chart illustrating the basic operation of an alternate embodiment of the mailbox displayer according to the invention.

As mentioned above, the remainder of Appendix A is substantially the same as the mailbox component of Appendix B of the parent application and the description of it is adequately set forth in the previously incorporated parent application. Those skilled in the art will appreciate that the code listings of the Appendices are particular to the MACROMEDIA DIRECTOR development suite and that the same functionality may be achieved using a different development environment. FIG. 5 illustrates the functionality of the mailbox display function in a more generic manner which can apply to different programming languages.

Referring now to FIG. 5, the mailbox display starts at 201 to read the list of messages. It checks at 202 to determine whether the TYPETABLE has been initialized. If it has not, the TypeTable is initialized at 204 as described in detail below with reference to FIG. 7. The mailbox display gets the next message listing at 203. For the message listing obtained at 203, the mailbox proceeds to obtain properties for the listing at 205 and property values at 207. If it is determined at 209 that the property uses an icon for display, a "get icon" routine is called at 211 (this routine is illustrated at FIG. 6). The message properties that concern the present application are (a) the message MIME type and (b) whether the message has a file attachment. In the flow charts in FIG. 5 (209) the system looks up whether current message property which is implemented as a LINGO symbol, e.g. #type, #date, #mailbox, #status, is represented by an icon. Although in the current implementation, each property is coded separately, the more general implementation described in the flowchart of FIG. 5 could be accomplished by checking whether the target symbol, e.g. #type was an element of a list data structure, e.g. Properties_with_Icons =(#type, #has_attachment) in procedure 209 of FIG. 5. The icon is displayed at 213. If it was determined at 209 that the property does not use an icon, the property value is displayed at 215. At 217 it is determined whether there are additional properties for this message listing. If there are, the program returns to 205. If there are not, it is determined at 219 whether there are more message listings to list. If there are, the program returns to 203. If there are not, the program ends at 221.

FIG. 6 illustrates a generalization of the functionality contained in Appendix A at lines 328–350. This is the generalized "get icon" routine called at 211 in FIG. 5. The routine starts at 301 having been provided the property name and property value by the calling program. If it is determined at 303 that the property is "mimetype" or, to conform to the LINGO implementation, "#type", the icon of the mimetype is obtained at 305 and a pointer to the icon is passed back to the calling program at 307. The actual steps involved in getting the icon for a mimetype are illustrated in FIG. 6a. If it is determined at 309 that the property is "has attachment", the icon for "has attachment" is obtained at 311 and a pointer to the icon is passed back to the calling program at 307. The procedure that gets the file attachment icon is described in FIG. 6b for a Microsoft Windows platform. Alternatively, the TYPETABLE data structure could include a field for filetype that is used to map from file extensions to MIME types and MIME type icons. If TYPEDATA were modified in this way, both message type and file type icon lookups would use the TYPETABLE. A related modification in the TYPE_UPDATER would be required to install the filetype/MIMEtype associations as they are encountered either via a previously unknown message type or a previously unknown file type. Because file type extensions are not as rich as Mimetypes, the same file type extension may map to many different MIME types. For example this could occur for different versions of the same software if the software manufacturer assigns different MIME subtypes for different versions of their software.

If it is determined at 313 that the property is "message read", the icon for "message read" is obtained at 315 and a pointer to the icon is passed back to the calling program at 307. If it is determined at 317 that the property is "priority", the icon for "priority" is obtained at 319 and a pointer to the icon is passed back to the calling program at 307. From the foregoing, those skilled in the art will appreciate that many different icons can be displayed for different properties.

FIG. 6a illustrates a generalization of the implementation contained at lines 328–346 of Appendix A. This is the "get icon for mimetype" function called at 305 in FIG. 6. This routine starts at 302 having been given the "mimetype" by the calling program. It determines at 304 whether the TYPETABLE has been initialized. If not, initialization is performed at 306. The initialization routine may reside in the TYPE_UPDATER component or may call functions that reside in the TYPE_UPDATER component. For example, in the LINGO implementation, the function $Read_{13}$ TypeTable_File (FIG. 8), which is part of the TYPE_UPDATER component is used to initialize the TYPETABLE data structure. After initialization, or if it was determined at 306 that the TYPETABLE was already initialized, the mimetype is used to retrieve an icon pointer from the TYPETABLE at 308. See Appendix A, lines 328–342. It is determined at 310 whether the icon pointer is null. If it is, an "install message type" routine is called at 312. The "install message type" routine, which is contained in the TYPE_UPDATER component, is explained in detail below with reference to FIG. 11 which illustrates the installation of new message handlers and icons for mimetypes. If the icon pointer is not null, it is determined at 314 whether the icon pointer points to "icon not installed". If that is the case, the icon pointer is set to the default pointer at 316. In either case, a non-null pointer is returned to the calling program at 318.

FIG. 6b illustrates an exemplary procedure for getting an icon for an attachment to an email message. Starting at 320, the file extension of the attachment is read. (Note that on a Windows platform, the three letters following "." in a filename determine the "filetype". With other platforms, such as the Macintosh platform, the filetype and "creator code" are listed in the "resource fork" of the file. Thus, for those platforms, the first step will be to read the filetype (and creator code) from the resource fork of the file.) Once the filetype (or filetype and creator code) have been determined, the routine attempts at 322 to find an appropriate icon in the SG_TYPETABLE. If it is determined at 324 that no appropriate icon has been found, the routine attempts at 326 to find an appropriate icon in the SG_ATTACH_TYPETABLE. If it is determined at 328 that no appropriate icon has been found, the routine attempts at 330 and 332 to find an appropriate icon in the system registry. (Note that with other operating systems, icon resources may be stored in different places. E.g., in the Macintosh OS, icon resources are stored in the invisible "desktop" file.) If at 334 a suitable icon is found, a pointer to the icon is set at 336 and the pointer is written to the SG_ATTACH_TYPETABLE at 338. The icon pointer is returned to the mailbox displayer at 340. See 311 in FIG. 6 and 211 in FIG. 5. If a suitable icon is not found at 342, no icon pointer is provided.

Figure 7:
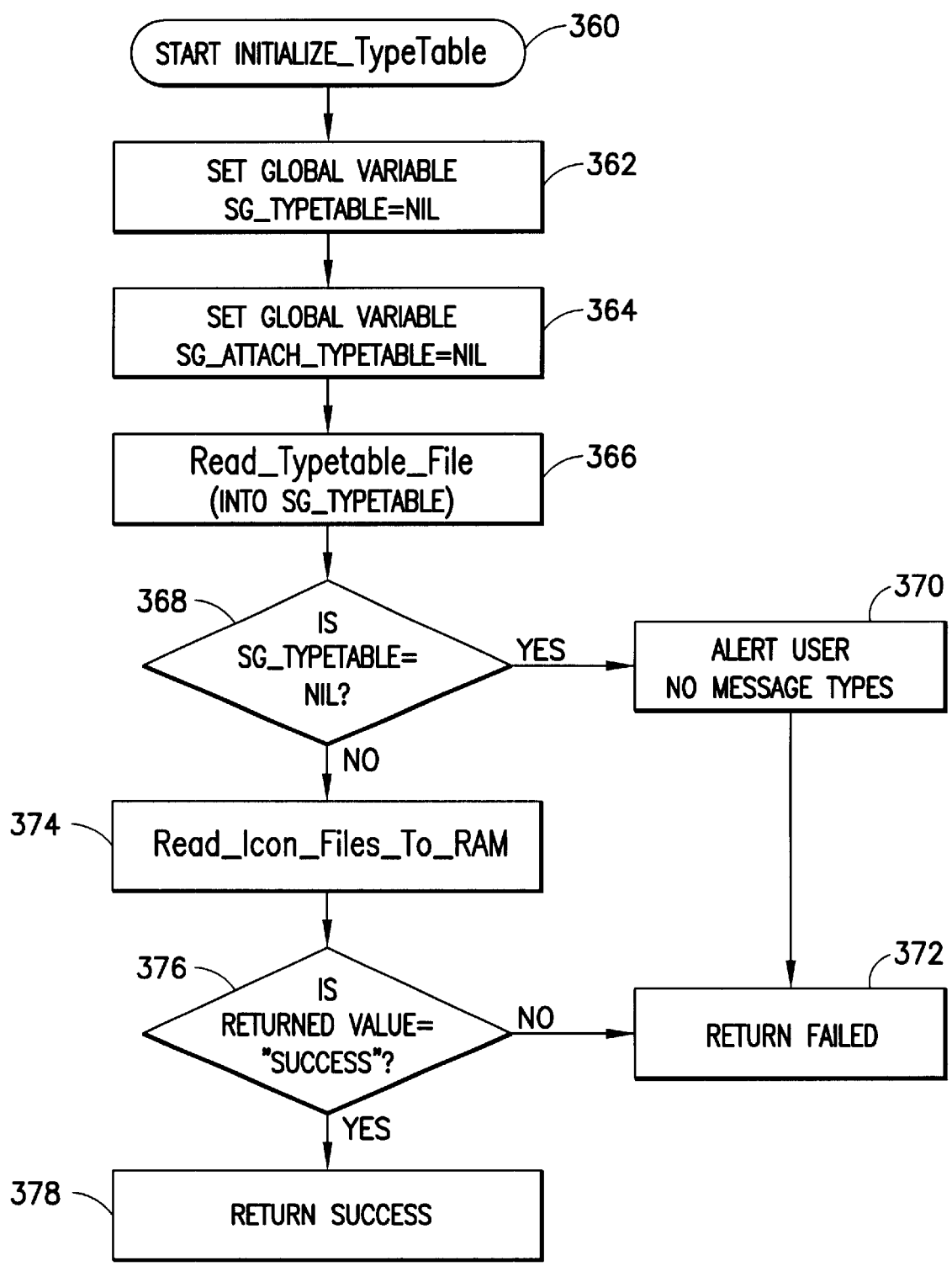
FIG. 7 is a simplified flowchart illustrating the initialize_TypeTable function of one embodiment of the type updater component.
Figure 8:
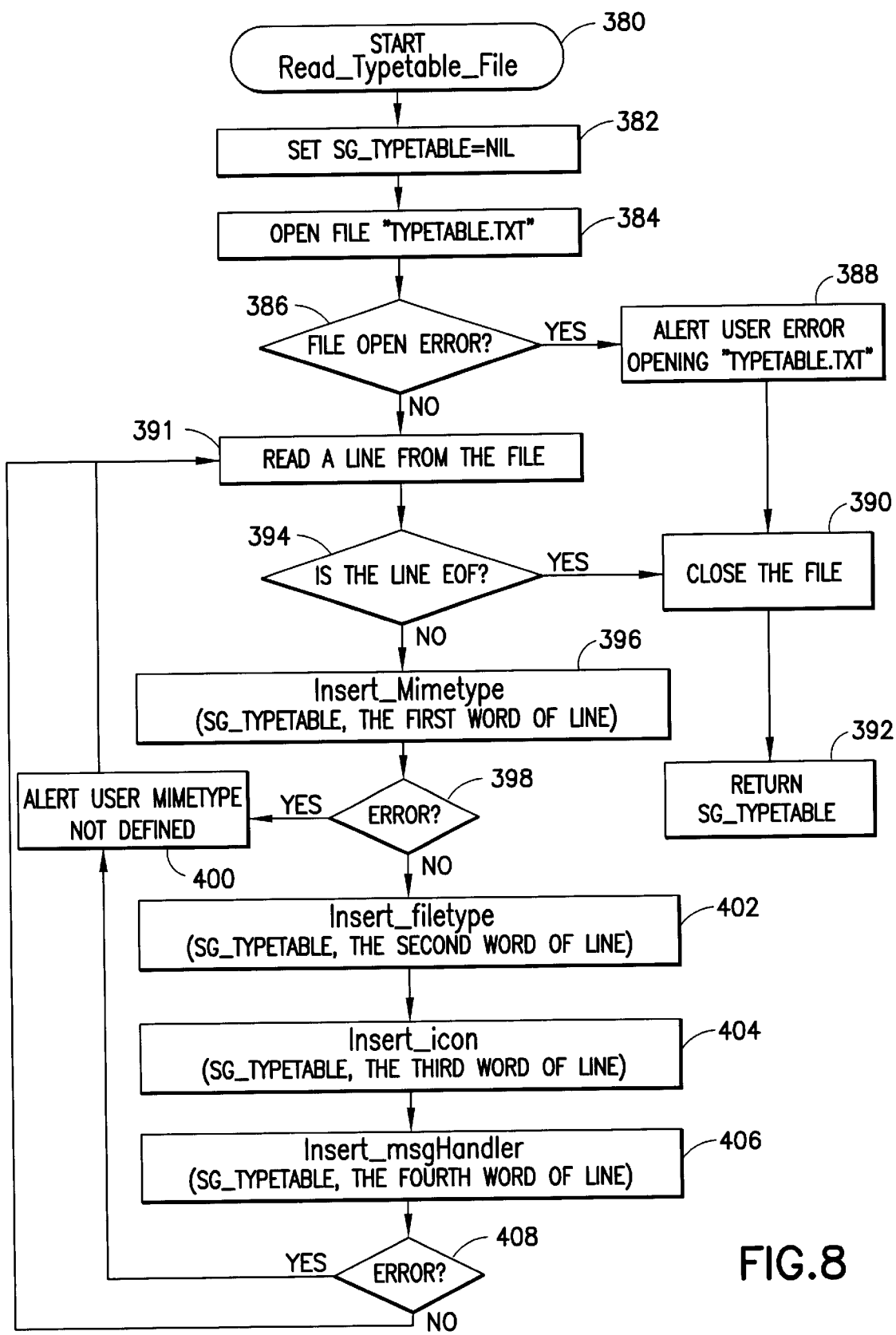
FIG. 8 is a simplified flowchart illustrating the read_TypeTable_file function of one embodiment of the type updater component.

Turning now to Appendix B, lines 1–26 provide an overview and introduction to the Type Updater. The Type updater includes eleven functions. Three of the them are public functions called by the mailbox displayer. These include: Initialize_TypeTable, Install_Type, and Uninstall_Type. The remaining eight functions are private functions used within the Type Updater. These include: Write_Typetable_File, Read_Typetable_File, Read_Icon_Files_To_RAM, read_iconFile, delete_mimetype, insert_mimetype, delete_filetype, insert_filetype. The Initialize_TypeTable function is illustrated in FIG. 7 and at lines 29–60 in Appendix B. The function begins at 360 in FIG. 7, sets the SG_TYPETABLE to nil at 362 (line 39 in Appendix B). The SG_ATTACH_TYPETABLE is set to nil at 364 (line 43 in Appendix B). The Typetable file stored on disk is read into SG_TYPETABLE at 366 (line 44 in Appendix B). The read_typetable_file internal function is illustrated in FIG. 8 and at lines 207–252 in Appendix B. An error check is performed at 368 (line 46 in Appendix B) to determine whether any data was loaded into RAM. If no data was read, the user is alerted at 370 (line 47 in Appendix B) and a failure is returned at 372 (line 48 in Appendix B). Otherwise, icon files are read into RAM at 374 (line 51 in Appendix B). An error check is performed at 376 (line 47 in Appendix B). If the data was read successfully, the function ends at 378 (line 60 in Appendix B).

Turning now to FIG. 8 and at lines 207–252 in Appendix B, the read_typetable_file function starts at 380 (line 218 in Appendix B). The SG_TYPETABLE is set to nil at 382 (line 222 in Appendix B). The typetable.txt file is opened at 384 (lines 224–227 in Appendix B) and a file open error check is performed at 386 (line 229 in Appendix B). If an error in opening the file is detected, an error alert is produced at 388 and (line 230 in Appendix B), the file is closed at 390 (line 231 in Appendix B), and a SG_TYPETABLE is returned at 392 (line 232 in Appendix B). If the file was opened without error, the first line is read at 391 which begins a loop (steps 394–408) which ultimately ends at 394 when the end of file is reached after which the file is closed at 390 (line 231 in Appendix B), and a SG_TYPETABLE is returned at 392 (line 232 in Appendix B). As shown in Appendix B at lines 235–239, the LINGO implementation reads the entire file into a string and simulates line by line reading because LINGO cannot read line by line. When a line is read, the first word in the line is the mimetype (line 243 in Appendix B). The mimetype is inserted into SG_TYPETABLE at 396 (line 244 in Appendix B). If the mimetype is not defined as discovered at 398, the user is alerted at 400 and the next line is read at 391. If the mimetype is defined, the next word in the line (filetype) is read and inserted into SG_TYPETABLE at 402 (line 245 in Appendix B). The next word in the line (iconFileName) is read and inserted into SG_TYPETABLE at 404 (line 246 in Appendix B). The next word in the line (msgHandler) is read and inserted into SG_TYPETABLE at 406 (line 247 in Appendix B). Any errors detected at 408 are reported at 400. As mentioned above, the process continues until the typetable.txt file is completely read.

Figure 9A:
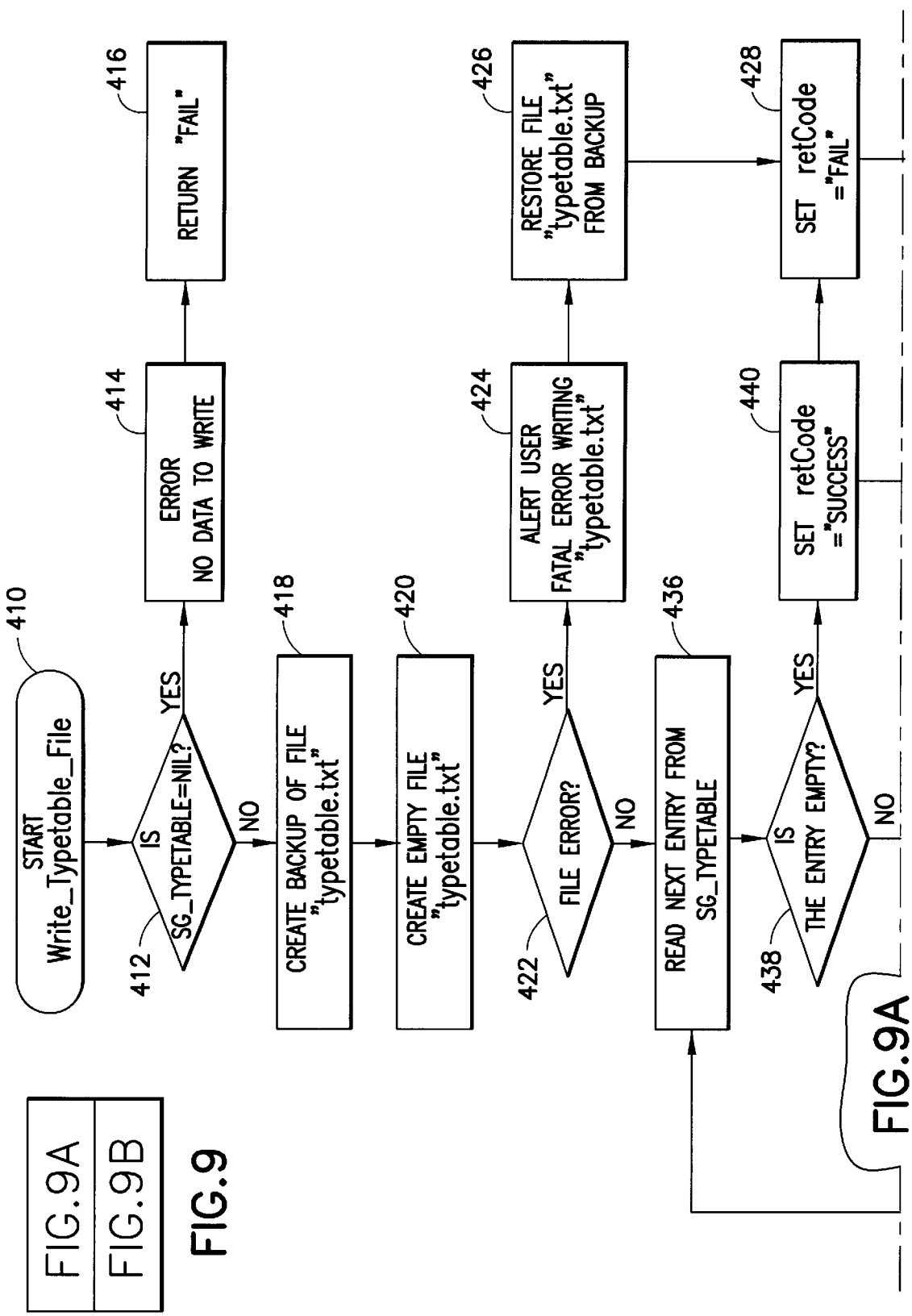
FIG. 9 is a simplified flowchart illustrating the write_TypeTable_file function of one embodiment of the type updater component.

The function Write_TypeTable_File is described in FIG. 9 and at lines 159–206 of Appendix B. This function writes the contents of SG_TYPETABLE back to typetable.txt after new mimetypes and icons have been added to the SG_TYPETABLE via the Install_Type function described below with reference to FIG. 11. The Write_TypeTable_File function begins at 410 (line 163 in Appendix B) and first checks at 412 (line 168 in Appendix B) whether the SG_TYPETABLE structure is empty. If it is empty, it returns an error message at 414 (line 169 in Appendix B) and a failure message at 416 (line 170 in Appendix B). If the SG_TYPETABLE structure is not empty a backup copy of the typetable.txt file is created at 418 (line 173 in Appendix B) and a new empty file is created at 420 (lines 176–180 in Appendix B). An error check is performed at 422 (line 181 in Appendix B) and if an error is detected in creating the new file, an error message is returned at 424 (line 182 in Appendix B). The backup file is restored at 426 (line 183 in Appendix B) and a return code is set to "fail" at 428 (line 184 in Appendix B). The typetable.txt file is closed at 430 (line 203 in Appendix B). The backup is deleted at 432 (line 204 in Appendix B) and the return code is returned at 434 (lines 205–206 in Appendix B). If there is no error creating the new file, it is opened for write access at line 187–188 in Appendix B and a starting line counter is set at line 191. The first (next) entry in the SG_TYPETABLE is read at 436 (line 192 in Appendix B). If it is determined at 438 (line 193 in Appendix B) that the end of SG_TYPETABLE has been reached, the return code is set to "success" at 440 (line 201 in Appendix B), the file is closed 430, the backup is deleted 432 and the return code is returned 434.

Until the end of SG_TYPETABLE is reached, data is set to write at 442 and the mimetype is written at 446 (line 194 in Appendix B) to a string. The filetype, iconfilename, and messagehandlerfilename are added to the string at 446, 448, and 450 respectively (lines 195–197 in Appendix B). The string is written to the new typetable.txt file at 452 (line 198 in Appendix B) and a line delimiter is written at 454 (lines 199–200 in Appendix B). The function loops back to 436 and continues until all of the entries in SG_TYPETABLE are read and written to the new typetable.txt file.

Figures 10, 10A:
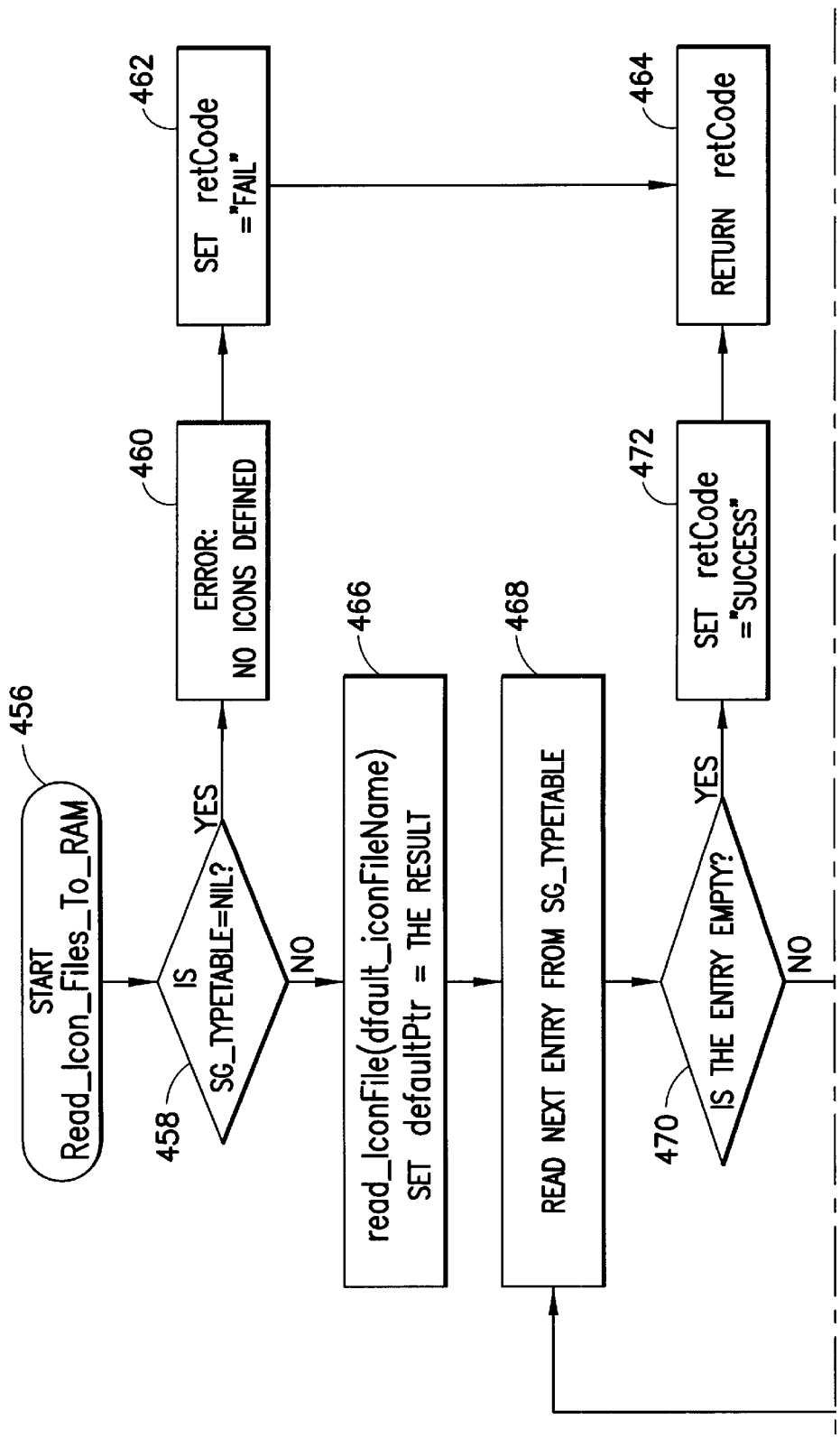
FIG. 10 is a simplified flowchart illustrating the read$_{13}$ icon_files_to_RAM function of one embodiment of the type updater component.
Figure 10B:
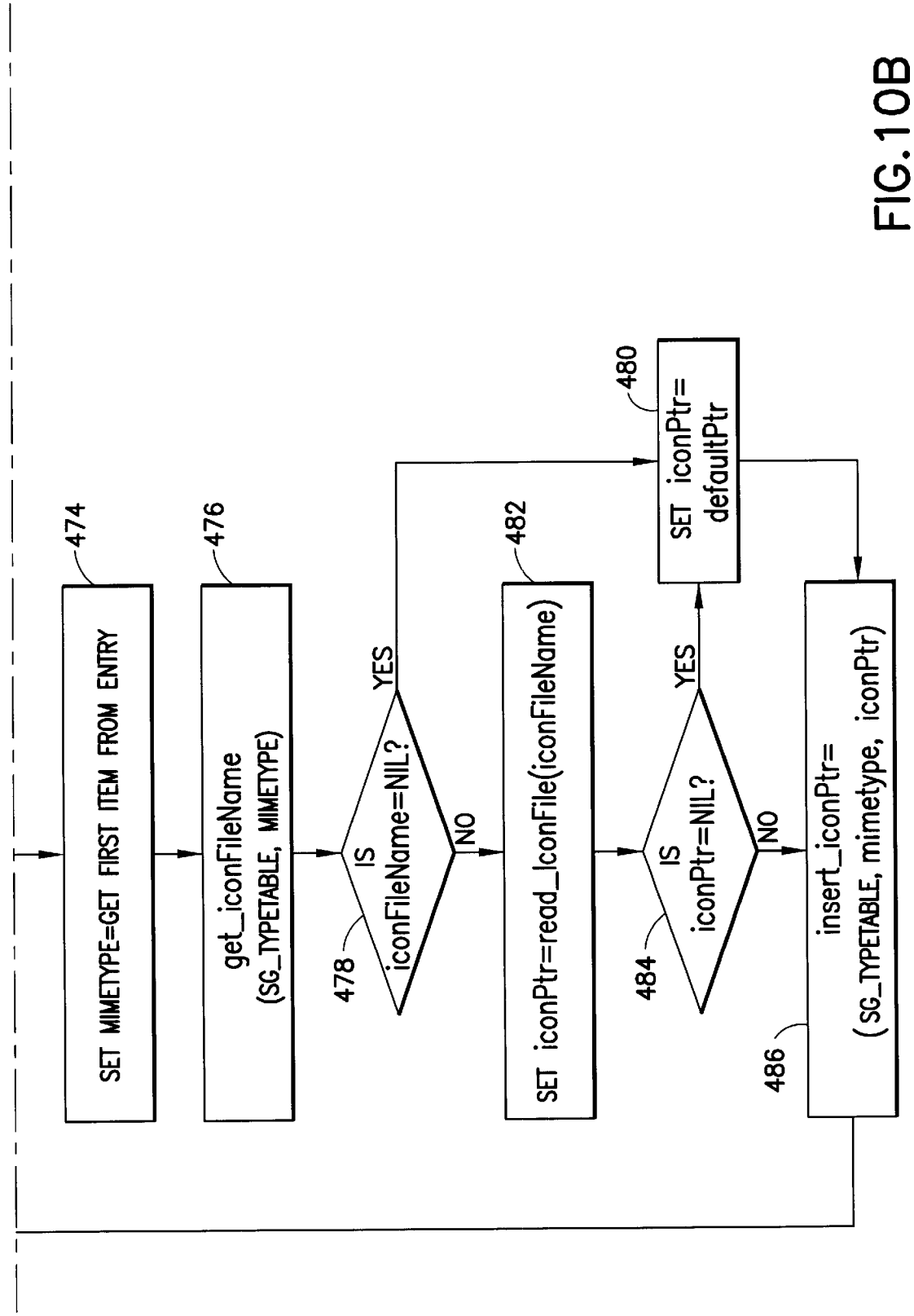

FIG. 10 illustrates the function Read_Icon_Files_To_RAM which is presented in Appendix B at lines 255–290. Starting at 456 in FIG. 10 (line 255 in Appendix B), the function first determines at 458 (line 259 in Appendix B) whether any mimetypes are defined in the structure SG_TYPETABLE. If there are none, no icons are defined, an error message is returned at 460 (line 260 in Appendix B), the return code is set to "fail" at 462 (line 261 in Appendix B) and the return code is returned at 464 (lines 261–262 in Appendix B). If the structure SG_TYPETABLE is not empty, the function loads the default icon into RAM and sets a pointer to it at 466 (line 265 in Appendix B). Icon pointer numbers are related to LINGO castNumbers at line 268 in Appendix B and a counter for incrementing the castNumbers is set at line 270. The first (next) entry in the structure SG_TYPETABLE is read at 468 (line 271 in Appendix B). If it is determined at 470 (line 272 in Appendix B) that there are no more entries to read, the return code is set to "success" at 472 and the return code is returned at 464 (line 288 in Appendix B). So long as entries remain, the mimetype is read at 474 and the iconfilename is for the mimetype is read at 476 (line 273 in Appendix B). If it is determined at 478 (line 274 in Appendix B) that there is no icon associated with this mimetype, the default icon pointer is assigned to it at 480 (line 275 in Appendix B). Otherwise, the next icon bitmap and pointer are read at 482 (line 277 in Appendix B) using the function read_iconfile (lines 295–298 in Appendix B). If the icon pointer is not nil as determined at 484 (line 278 in Appendix B), the castNum is incremented at line 279. Otherwise the castNum is not incremented and the default icon pointer is used at 480 (line 280 in Appendix B). In either case, the icon pointer associated with the mimetype is inserted at 486 (line 283 in Appendix B). The counter is incremented at line 284 and the next entry from SG_TYPETABLE is read at 468 (line 285 in Appendix B).

Figure 11A:
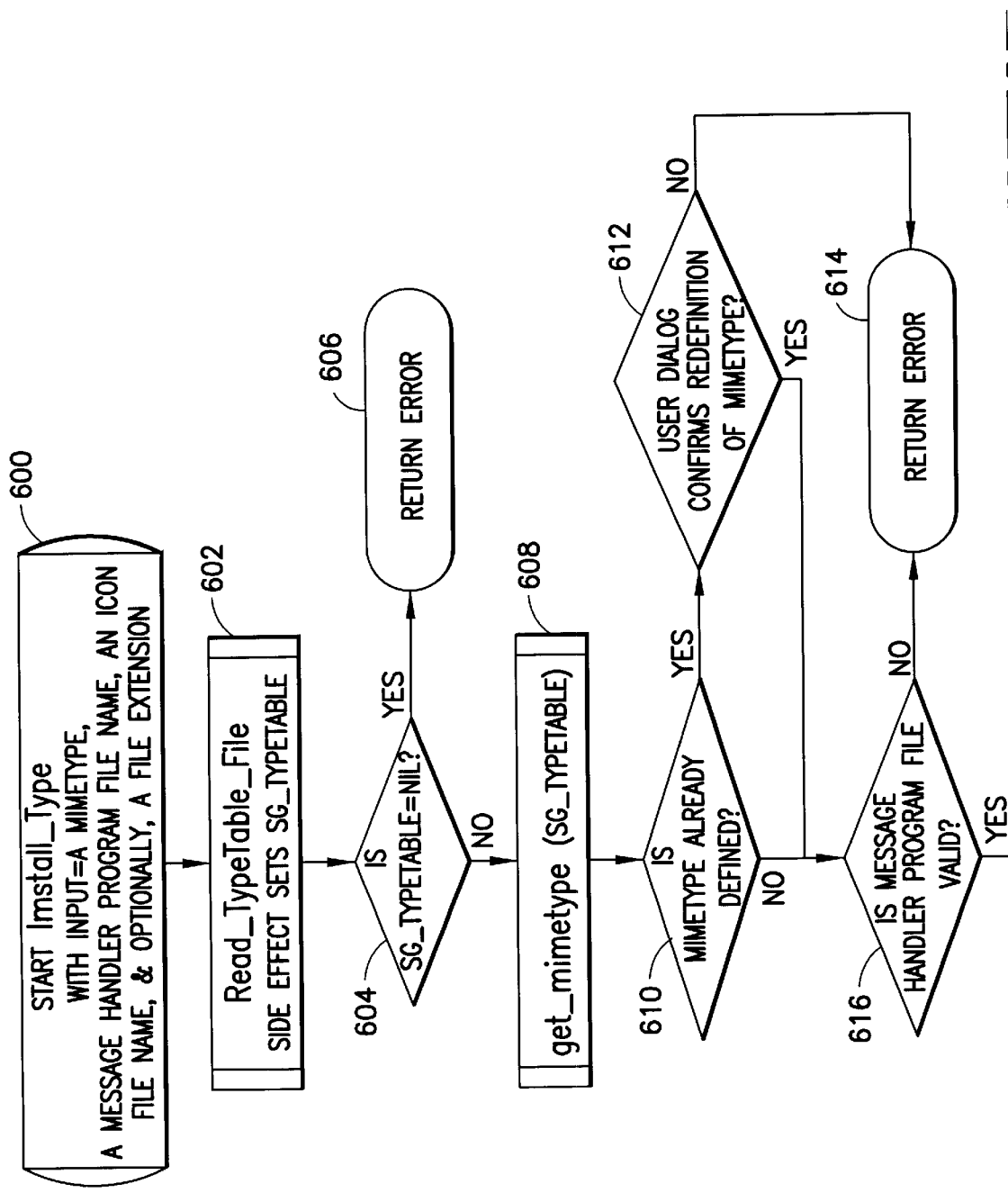
FIG. 11 is a simplified flowchart illustrating the install_Type function of one embodiment of the type updater component.
Figure 11B:
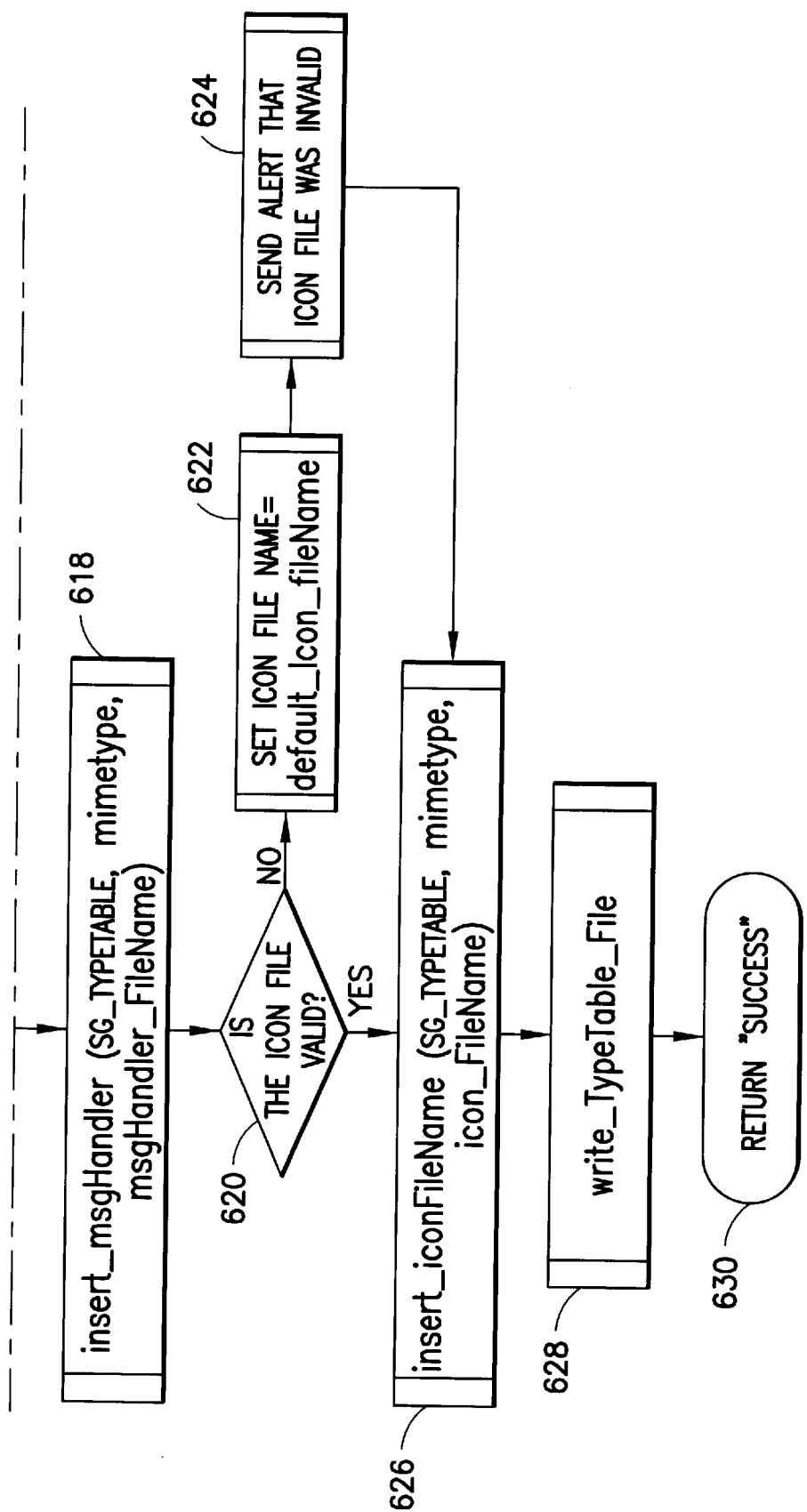

FIG. 11 illustrates the function install_type which is used to install a new icon and/or message handler for a particular mimetype or filetype. The function starts at 600 with input which includes an icon file name, a message handler program name, and either a mimetype or a filetype (lines 71–75 in Appendix B). This input can be provided by the user or by an automatic means as described below. The typetable file is read into RAM at 602 (line 78 in Appendix B) thereby creating SG_TYPETABLE. If SG_TYPETABLE is empty as determined at 604 (line 80 in Appendix B), an error is returned at 606 (lines 81–82 in Appendix B). Otherwise, the mimetype (or filetype) specified at 600 is retrieved at 608 (line 87 in Appendix B) from SG_TYPETABLE if it exists. If the mimetype (or filetype) exists in SG_TYPETABLE and if it is already associated with an icon and message handler, the user is prompted at 612 (line 90 in Appendix B) whether it should be redefined. If the user chooses NO, an error is returned at 614 (line 94 in Appendix B). If the mimetype was not previously defined or if the user chooses to redefine it, the message handler program specified at 600 is checked for validity (e.g. whether it is present on the hard disk or network) at 616 (line 102 in Appendix B). If it is not valid, an error is returned at 614 (lines 104–105 in Appendix B). If the message handler and the mimetype (filetype) are valid, they are associated with each other in SG_TYPETABLE at 618 (line 108 in Appendix B). Next, the icon file name specified at 600 is checked for validity at 620 (line 110 in Appendix B). If it is not valid, the default icon is specified at 622 (line 112 in Appendix B) and an error alert is returned at 624 (line 111 in Appendix B). In either case, the icon file name specified or the default icon, if necessary, is associated with the message handler and the mimetype (filetype) in SG_TYPETABLE at 626 (line 114 in Appendix B). The typetable.txt file is written back from SG_TYPETABLE at 628 (lines 122–125 in Appendix B) and unless an error is encountered, a success is returned at 630 (line 126 in Appendix B).

Those skilled in the art will appreciate that the install_type function can be called by another program so that icons are automatically installed/removed when modular authoring/reading components are installed/removed. Though not specifically shown in code or drawings herein, those skilled in the art will appreciate how to implement this second embodiment by referring to Appendix B herein and the component installing code of the parent application.

According to a third embodiment, new icons are added automatically whenever a new message type is encountered by the mailbox displayer. The new icon is retrieved from either the operating system registry or from the icon image data embedded in the message. Those skilled in the art will appreciate the implementation of this embodiment by reference to Appendix B herein and the above referenced MIME standards.

According to a fourth embodiment, the type updater automatically queries a network server for new icon information and downloads icon image data as needed or as scheduled. Those skilled in the art will appreciate that automatic updaters which download data from a file server are well known and that this embodiment may be implemented by reference to the known automatic updaters together with Appendix B herein.

There have been described and illustrated herein several embodiments of an enhanced electronic mail system including methods and apparatus for identifying mime types and for displaying different icons. While particular embodiments of the invention have been described, it is not intended that the invention be limited thereto, as it is intended that the invention be as broad in scope as the art will allow and that the specification be read likewise. Thus, while particular code listings have been disclosed, it will be appreciated that other code could be utilized. For example, although the Appendices illustrate the invention with MACROMEDIA DIRECTOR LINGO code, the invention could be embodied with C++, based on a "MOZILLA" engine, or via a number of other popular development tools. Also, while the invention has been disclosed with reference to the applicant's parent application which involves an email client having installable authoring/reading components, it will be recognized that the principles disclosed herein for displaying icons representing mimetypes in a mailbox listing may be applied to other kinds of email clients. Moreover, while particular configurations have been disclosed in reference to the way icon images are stored (i.e. scalable images), it will be appreciated that other configurations could be used as well. Further, while the invention has been shown with reference to display on a computer screen, it will be appreciated that the display may be on a television, a personal digital assistant, a cell phone, a wrist watch, etc. It will therefore be appreciated by those skilled in the art that yet other modifications could be made to the provided invention without deviating from its spirit and scope as so claimed.

Appendix A - Mailbox Displayer Code - Page 1

```
1   -- MBOX_DISPLAYER IMPLEMENTATION
2   ---- Code for a mailbox handler for the KidCode electronic mail client.
3   ---- This Director MIAW displays a mailbox in a window as a list
4   -- of messages with one line for each message. Each message has the following fields displayed:
5   -- 1. message number
6   -- 2. Message sender
7   -- 3. Message mimetype & status (single icon used to indicate both properties)
8   -- 4. Message subject header
9   -- 5. Message date
10
11
12  on startMovie
13      global SG_lastActiveWindow -- super global that keeps track of KC last active window
14      global mbxG_username -- current user name
15      global mbxG_messages -- list of messages
16      global mbxG_nMsgs -- number of messages in mailbox
17      global mbxG_boxName -- current mailbox name
18      global mbxG_whichLine -- current hilite line = msgNumber
19      global mbxG_subtractLine
20      global mbxG_lips
21
22      set mbxG_lips = 0
23
24      -- called by API to Main Movie
25      tell the stage to emh_continue(#mailbox)
26  end
27
28
29  on activateWindow
30      global SG_lastActiveWindow
31      global mbxG_myWindow
32      set SG_lastActiveWindow = mbxG_myWindow
33  end activateWindow
34
35
36  -- Stop movie handlers
37  _____
38  StopMovie handler in a MIAW is called only when the movie
39  -- plays through to the end or jumps to another movie.
40  -- It isn't called when the window is closed or the window
41  -- is deleted by the forget window command.
42
43  on stopMovie
44      cleanUpMovie()
45  end
46  _____
47  called to close a MIAW or automatically whenever
48  -- forgetWindow is called
49
50  on closeWindow
51      cleanUpMovie()
```

Appendix A - Mailbox Displayer Code - Page 2

```
52   end
53   ─────────────────────────────────────────────
54
55   -- cleanUpMovie can be called by both stopMovie and
56   -- closeWindow.
57
58   on cleanUpMovie
59         global mbxG_whichLine
60         global mbxG_subtractLine
61         global mbxG_nMsgs
62         global mbxG_username
63         global mbxG_lips
64
65         -- CLEAR FIELDS AND GLOBAL VARIABLES
66
67         put "" into field "MailboxTitle"
68         put "" into field "prepositionTitle"
69         put "" into field "MessageNumber"
70         put "" into field "MailboxTo"
71         put "" into field "MailboxSubject"
72         put "" into field "MailboxDate"
73         put "" into field "Messageread"
74
75         set mbxG_nMsgs = 0
76         set mbxG_lips = 0
77         resetHilite()
78
79         if findEmpty(member 50) > 50 then
80               set the scriptText of member 50 = ""
81         end if
82
83         set the memberNum of sprite 6 = the memberNum of member "lips up"
84         set the loc of sprite 4 to point(800, 4)
85         set the loc of sprite 5 = point(800, 19)
86   end cleanUpMovie
87
88
89   -- API Public Handlers ─────────────────────────────
90   --
91   -- Ugly hack to work around problem with Director startup
92   -- of MIAWs. The problem is that, after calling a handler in the
93   -- MIAW, the StartMovie handler for the MIAW does not run until
94   -- the calling movie advances to its next frame.
95   -- Therefore, the calling sequence in the calling movie
96   -- has to be engineered so that the real handlers in the MIAW do not
97   -- run until after control has been transfered back to the calling
98   -- movie. However, at least one handler in the MIAW must be called
99   -- by the calling movie before the StartMovie handler will run.
100
101  -- startMeUp is the fake handler that, when called by the
102  -- main movie, will upon return to the main movie,
```

Appendix A - Mailbox Displayer Code - Page 3

```
103     -- cause this movie's startMovie handler to run.
104
105     -- The second part of this wormy hack is contained in the MIAW's
106     -- startMovie handler... It is a call to a workAround handler in
107     -- the calling movie called continueComponent
108     -- The calling movie's continueRebus handler calls the real handlers
109     -- in the MIAW.
110
111     on emc_startMeUp
112           -- put "Macromedia sucks!"
113           return(TRUE)
114     end emc_startMeUp
115
116     ─────────────────────────────────────────────
117     initWindow is called by email main when a message handler
118     -- is opened
119
120     on emc_initWindow userName, windowName
121           global mbxG_myWindow
122           global mbxG_username
123           global mbxG_platformType
124
125     -- put "ENTER emc_initWindow mailbox"
126           set mbxG_username = userName
127           set mbxG_myWindow = windowName
128
129           -- puppet the hilite (MB 4-17-99) removed this
130           resetHilite()
131           tell the stage to emh_getColorDepth()
132           set colorDepth = the result
133           mapColors(colorDepth)
134           tell the stage to emh_getPlatformType()
135           set mbxG_platformType = the result
136
137     -- put "EXIT emc_initWindow mailbox"
138
139           return(TRUE)
140
141     end emc_initWindow
142
143     ─────────────────────────────────────────────
144     -- closeWindow is not called unless Rebus plays as
145     -- a MIAW.
146
147     on emc_closeWindow
148     -- put "ENTER emc_closeWindow Mailbox"
149           closeWindow()
150           -- step frame
151     -- put "EXIT emc_closeWindow Mailbox"
152           return(TRUE)
153
```

Appendix A - Mailbox Displayer Code - Page 4

```
154  end emc_closeWindow
155
156  _____
157
158  on emc_getComponentInfo
159         return( list( "SimpleMail", 1, #mailbox, "text" ) )
160  end emc_getComponentInfo
161
162  _____
163
164  on mbx_getMessage
165  —      .
166  — — "open" button and doubleClick of highlighted message
167  — — calls to email main to hand the message
168  — — selected to a message handling movie
169  — — This script was previously the "open" cast memeber script:
170  —
171  — global mbxG_whichLine
172  — global mbxG_messages
173  —
174  — set mailData = getAt(mbxG_messages, mbxG_whichLine)
175  —
176  — return(mailData)
177  —
178  —
179  —
180  —end mbx_getMessage
181
182  _____
183
184  on mbx_getMessageNumber
185         global mbxG_whichLine
186         return(mbxG_whichLine)
187  end mbx_getMessageNumber
188
189  _____
190  — mbx_trashMessages returns a list of messages that are to
191  — be trashed in the mailfile. Email main will rewrite the mail file
192  — When implemented correctly, it will determine which message numbers
193  — are associated with the currently selected lines in the mailbox
194  — display, update the display to remove these messages from the
195  — list, and return the list of deleted message numbers.
196
197  on mbx_trashMessages
198
199         global mbxG_messages — list of messages
200         global mbxG_nMsgs — number of messages in mailbox
201         global mbxG_whichLine — current hilite line = msgNumber
202
203         — set mailData = getAt(mbxG_messages, mbxG_whichLine)
204         —
```

Appendix A - Mailbox Displayer Code - Page 5

```
205              — — tell the stage
206              — return(mailData)
207              — — end tell
208
209              — needs implementation that can handle multiple messages
210              — also need to rewrite trashIt which does not conform to
211              — API rule that only API handlers can be called in other movies
212              —
213              — set message = mbxG_messages
214              if mbxG_whichLine > 0 AND mbxG_whichLine <= mbxG_nMsgs then
215                      tell the stage to emh_alertUserToTrash()
216                      · set yes = the result
217                      if not yes then return [] -- user canceled
218
219                      set trashList = list(getAt(mbxG_messages, mbxG_whichLine))
220                      deleteAt(mbxG_messages, mbxG_whichLine)
221                      set mbxG_nMsgs = mbxG_nMsgs - 1
222                      displayMailbox(mbxG_messages)
223                      resetHilite()
224              else
225                      alert("Please click on the message you wish to delete.")
226                      set trashList = []
227              end if
228
229              return(trashlist)
230
231      end mbx_trashMessages
232
233      _____
234      — accepts a mailbox datastructure that consists of a boxname and
235      — a list of messages
236
237      on mbx_openMailbox mailbox
238              global mbxG_username
239              global mbxG_messages
240              global mbxG_boxName
241              global mbxG_nMsgs
242
243              — put "ENTER mbx_openMailbox"
244              set mbxG_boxName = getAt(mailbox, 1)
245              put mbxG_userName & "'s " & mbxG_boxName into field "mailboxTitle"
246
247              set mbxG_messages = getAt(mailbox, 2)
248              set mbxG_nMsgs = count(mbxG_messages)
249
250              displayMailbox(mbxG_messages)
251
252              — put "EXIT mbx_openMailbox"
253              return(TRUE)
254
255      end mbx_openMailbox
```

Appendix A - Mailbox Displayer Code - Page 6

```
256
257     _____
258
259     Utilities –
260     _____
261     Initialize formatting of text fields
262     — Thanks to Frank Leahy for this one
263
264     on SetTextInfo fldName, fldValue, fldAlign, fldFont, fldSize, fldStyle
265             if fldValue <> EMPTY then
266                     put fldValue into field fldName
267             end if
268             set the textAlign of field fldName = fldAlign
269             set the textFont of field fldName = fldFont
270             set the textSize of field fldName = fldSize
271             set the textStyle of field fldName = fldStyle
272     end
273
274     _____
275     on formatFields
276
277             — FORMAT THE TEXT FIELDS
278
279             setTextInfo "MessageNumber", " ", "left", "arial", 14, "bold"
280             setTextInfo "MailboxTo", " ", "left", "arial", 14, "bold"
281             setTextInfo "MailboxSubject", " ", "left", "arial", 14, "bold"
282             setTextInfo "MailboxDate", " ", "left", "arial", 14, "bold"
283             setTextInfo "Messageread", " ", "left", "arial", 14, "bold"
284
285     end formatFields
286
287     — MAIN MAILBOX DISPLAY FUNCTION
288     — displays a Mailbox style listing of messages
289     — places the appropriate components from each message
290     — into field members with lines aligned for display
291
292     on displayMailBox msgList
293             global SG_TYPETABLE — super global variable shared across different MIAWS
294             global mbxG_red
295             global mbxG_platformType
296             global mbxG_iconList
297
298             — mbxG_iconList for future use in up/down scroll scripts
299             set mbxG_iconList = [:]
300             set count = 0
301
302             — first clear all the fields and the sprites
303             put "" into field "MessageNumber"
304             put "" into field "MailboxTo"
305             put "" into field "mailboxSubject"
306             put "" into field "mailboxDate"
```

Appendix A - Mailbox Displayer Code - Page 7

```
307         put "" into field "Messageread"
308
309         repeat with i = 40 to 70
310             set the member of sprite i = member "blank"
311         end repeat
312
313         -- Fill the text fields with info from all of the messages so that it is available
314         -- when the window scrolls
315         repeat with msg in msgList
316
317             ---- with the exception of mailbox, mimetype and status,
318             ---- the fields will automatically be displayed when filled
319
320             put the lineCount of member "MailboxTo"+1 & RETURN after field "MessageNumber"
321             put getProp(msg, #from) & RETURN after field "MailboxTo"
322             put getProp(msg, #subject) & RETURN after field "mailboxSubject"
323             put getProp(msg, #date) & RETURN after field "mailboxDate"
324             put getProp(msg, #mailbox) into mailbox
325             put getProp(msg, #mimetype) into mime
326             put getProp(msg, #status) into status
327
328             ---- Display the mimetype icon
329             ---- We use the mimetype icon to also indicate message status. A greyscale version of the
330             -- icon is displayed if a message has been read. Otherwise a color icon is displayed.
331
332             ---- Icons will be placed in sprite channel 40 and beyond
333                 set i = 40 + count
334                 set count = count + 1
335
336             -- find the icon for the message mimetype
337             ---- this code should be rewritten using a data access function. For now we need to
338             ---- know the format of the TYPETABLE data structure
339
340                 set mimeProperties = getProp(SG_TYPETABLE, mime)
341                 set iconCastMember = getAt(mimeProperties, 2) -- second item is the cast member
342                 number
343
344             -- if this type is unknown then use the default icon
345                 if iconCastMember = 0 then set iconCastMember = the number of member
346                 "DefaultIcon"
347
348             -- get the greyscale version of the icon if the message has been read.
349                 if status = "R" then set iconCastMember = iconCastMember + 1
350
351             -- add the icon to the list of icons used for scrolling the window
352                 append (mbx_iconList, iconCastMember)
353
354             -- place the icon at the proper location for display
355                 set the memberNum of sprite i to iconCastMember
356
357             -- display the icon in the correct grid cell in the mailbox message list.
```

Appendix A - Mailbox Displayer Code - Page 8

```
358            — set the locH of all icons to 50
359            set whereGoesIcon = the lineCount of member "MailboxTo"
360            puppetSprite i, TRUE
361            set the visible of sprite i = TRUE
362            set the locH of sprite i to 50
363
364            — precise placement of the icon next to it's message...
365            set positonVar = 105 + linePosToLocV(member "MailboxTo", whereGoesIcon)
366            set the locV of sprite i to positonVar
367            — but don't let icons fall go beyond window if there are many messages
368            if positonVar > 550 or positonVar < 105 then
369                    set the visible of sprite i = FALSE
370            else
371                    set the visible of sprite i = TRUE
372            end if
373            addProp mbxG_iconList, (the locV of sprite i), mime
374            end repeat
375
376    end displayMailbox
377
378    — FUNCTIONS USED TO RESPOND TO USER INTERACTION WITH MAILBOX
379    — HILITE MESSAGE is called when a user clicks a mouse on a message line
380
381    on hiliteMessage whichLine
382            global mbxG_nMsgs, mbxG_whichLine, mbxG_subtractLine, mbxG_messages
383
384    — KEEP TRACK OF SELECTED LINE
385
386    set mbxG_whichLine = whichLine
387
388    — MAKE SURE LINE IS VALID
389
390    if mbxG_whichLine <= 0 then
391            return(0) — do nothing, errors are caught elsewhere
392    else if mbxG_whichLine > mbxG_nMsgs then
393            — user clicked somewhere else in field
394            set mbxG_whichLine = 0 — reset to 0
395            return(0)
396    end if
397
398    — HIGHLIGHT SELECTED LINE
399
400    set whichHighlight = mbxG_whichLine + mbxG_subtractLine
401
402    — since all field members in display are kept synchronized
403    — any one will do for linePosToLocV
404    — use "MailboxTo", it's small
405
406    set the locV of Sprite 11 to ¬
407            (99 + linePosToLocV(member "MailboxTo", whichHighlight))
408
```

Appendix A - Mailbox Displayer Code - Page 9

```
409     —when the user double clicks on a hilited message, go get it from mailFile
410
411     if the doubleClick then
412             set maildata = getAt(mbxG_messages, mbxG_whichLine)
413             tell the stage
414                     emh_openMessage(maildata)
415             end tell
416             — mbx_getMessage()
417     end if
418
419     end hiliteMessage
420
421
422     _____
423     on resetHilite
424             global mbxG_whichLine, mbx_subtractLine
425
426             set mbxG_whichLine = 0
427             set mbxG_subtractLine = 0
428
429             — SET HIGHLIGHT OFF STAGE
430             set the loc of sprite 11 to point (11, -20)
431
432     end resetHilite
433     _____
434     — this is a lookup table for color
435     — only really necessary for Mac platform
436     — use on any color that you want to
437     — set the forecolor of field
438
439     on mapColors colorDepth
440             global mbxG_red
441             global mbxG_blue
442             global mbxG_white
443             global mbxG_black
444
445             case colorDepth of
446
447                     8:
448                             set mbxG_red = 6
449                             set mbxG_blue = 4
450                             set mbxG_white = 0
451                     16:
452                             set mbxG_red = 31744
453                             set mbxG_blue = 31
454                             set mbxG_white = 32767
455                     32:
456                             set mbxG_red = 16711680
457                             set mbxG_blue = 255
458                             set mbxG_white = 16777215
459
```

Appendix A - Mailbox Displayer Code - Page 10

```
460         end case
461
462         set mbxG_black = the forecolor of line 1 of member the member of sprite 4
463
464     end mapColors
465
466     ─────────────────────────────────────────────────────────────────────
467     scripts run when the mouse is clicked on a mailbox message line.
468     A script is needed for each field in the message line.
469
470     on mouseUp
471             hiliteMessage (the clickon - 40)
472     end
473
474
475     on mouseDown
476
477             global mbxG_lips
478             set whichLine = the mouseLine
479             if mbxG_lips then
480                     set astr = line whichline of field "MailboxTo"
481                     speak(astr)
482             else
483                     hiliteMessage(whichLine)
484             end if
485     end
486
487     on mouseDown
488
489             global mbxG_lips
490             set whichLine = the mouseLine
491             if mbxG_lips then
492                     set astr = line whichline of field "MailboxSubject"
493                     speak(astr)
494             else
495                     hiliteMessage(whichLine)
496             end if
497     end
498
499     ─────────────────────────────────────────────────────────────────────
500     more scripts run when the mouse is clicked on a mailbox message line
501
502     on mouseDown
503             global mbxG_lips
504             set whichLine = the mouseLine
505             if mbxG_lips then
506
507                     set astr = line whichline of field "MailboxDate"
508                     set aday = word 1 of astr
509                     case aday of
510                             "Mon,": put "Monday" into word 1 of astr
```

Appendix A - Mailbox Displayer Code - Page 11

```
511                     "Tue,": put "Tuesday" into word 1 of astr
512                     "Wed,": put "Wednesday" into word 1 of astr
513                     "Thu,": put "Thursday" into word 1 of astr
514                     "Fri,": put "Friday" into word 1 of astr
515                     "Sat,": put "Saturday" into word 1 of astr
516                     "Sun,": put "Sunday" into word 1 of astr
517                     otherwise
518                 end case
519
520             speak(astr)
521         else
522             hiliteMessage(whichLine)
523         end if
524 end
525
526 on mouseDown
527     global mbxG_lips
528
529     set whichLine = the mouseLine
530     if mbxG_lips then
531         set astr = line whichline of field "MessageNumber"
532         speak(astr)
533     else
534         hiliteMessage(whichLine)
535     end if
536 end
537
538
539 -- this script is attached to the message type icon which is displayed in the message line
540
541 on mouseUp
542     set whichLine = the mouseLine
543     hiliteMessage(mouseLine)
544 end
545
546 ------ code for scroll buttons
547
548 on mouseDown
549     global mbxG_whichLine
550     global mbxG_subtractLine
551     global mbxG_iconList
552
553     -- SCROLL UP WITH HIGHLIGHT
554     -- ICONS NOW SCROLL... HOWEVER, ICON SPRITE POSITION IS BASED ON
555     -- MBXG_SUBTRACTLINE, NOT ON THE THE ACTUAL CORRESPONDING LINE
556     NUMBER
557     -- OF THE MESSAGE IN THE MAILBOX WINDOW.
558
559     set numberOfIconsVar = count(mbxG_iconList)
560     set lastIconPos = getPropAt(mbxG_iconList, count(mbxG_iconList))
561     if lastIconPos >= 550 then
```

Appendix A - Mailbox Displayer Code - Page 12

```
562              — there are enough messages to make scrolling nessisary
563              repeat while the mouseDown = TRUE
564
565              —oldSubtractLine gets set to mbxG_subtractLine before mbxG_sub. gets
566              —incremented. This keeps the icons from falling one position behind
567              —it's prospective message
568
569              set oldSubtractLine = mbxG_subtractLine
570              set mbxG_subtractLine = mbxG_subtractLine + 1
571
572              if mbxG_subtractLine > 0 then
573                      set mbxG_subtractLine = 0
574              end if
575
576              — SCROLL ALL FIELDS TOGETHER
577
578              scrollByLine member "MessageNumber", -1
579              scrollByLine member "MailboxTo", -1
580              scrollByLine member "MailboxSubject", -1
581              scrollByLine member "MailboxDate", -1
582              scrollByLine member "mime", -1
583              scrollByLine member "Messageread", -1
584
585              set numberOfIcons = the lineCount of member "MailboxTo" + 40
586              set amountOfMail = the lineCount of member "MailboxTo"
587
588              — for debugging
589              — put "linecount:" & the lineCount of member "MailboxTo"
590              — put "subtractline:" & mbxG_subtractLine
591
592              repeat with i = 40 to numberOfIcons
593
594
595                      — if the following 2 conditions are true, then scroll the icons
596                      — i.e. if messages scroll, icons do too, if not, then neither do icons.
597
598                      if mbxG_subtractLine >= - amountOfMail + 1 and oldSubtractLine < 0 then
599                              set the locV of sprite i = the locV of sprite i + 15
600                              if the locV of sprite i < 105 then
601                                      set the visible of sprite i = FALSE
602                              else
603                                      set the visible of sprite i = TRUE
604                              end if
605                      else
606                              nothing
607                      end if
608              end repeat
609
610              — MOVE HIGHLIGHT WITH LINE, MOVING HIGHLIGHT
611              — OFF SCREEN WHEN LINE MOVES OFF SCREEN
612              set whichHighlight = mbxG_whichLine + mbxG_subtractLine
```

Appendix A - Mailbox Displayer Code - Page 13

```
613              if whichHighlight <= 0 or whichHighlight >= 22 then
614                set the loc of sprite 11 to point (11, -20)
615              else — set the locV of highlight to scrolled message
616                set the locV of Sprite 11 to (99 + linePosToLocV(member "MailboxTo", whichHighlight))
617              end if
618              updateStage
619            end repeat
620          end if
621     end
622
623     on mouseUp
624            set numberOfIcons = the lineCount of member "MailboxTo" + 40
625            repeat with i = 40 to numberOfIcons
626                if the locV of sprite i > 550 or the locV of sprite i < 105 then
627                    set the visible of sprite i = FALSE
628                else
629                    set the visible of sprite i = TRUE
630                end if
631            end repeat
632     end
633
634     on mouseDown
635            global mbxG_whichLine
636            global mbxG_subtractLine
637            global mbxG_iconList
638
639
640            — AS MESSAGES ARE SCROLLED, ICONS NEED TO MOVE WITH THE
641            MESSAGE, AND
642            THE MEMBERNUM
643            — OF ICON SPRITES BE ASSIGNED TO THE NEW MESSAGE THAT IS VISIBLE
644            AFTER
645            — BEING SCROLLED.
646            — ICONS NOW SCROLL... HOWEVER, ICON SPRITE POSITION IS BASED ON
647            — MBXG_SUBTRACTLINE, NOT ON THE THE ACTUAL CORRESPONDING LINE
648            NUMBER
649            — OF THE MESSAGE IN THE MAILBOX WINDOW.
650            set numberOfIconsVar = count(mbxG_iconList)
651            set lastIconPos = getPropAt(mbxG_iconList, count(mbxG_iconList))
652            if lastIconPos >= 550 then
653                — there are enough messages to make scrolling nessisary
654                repeat while the mouseDown = TRUE
655                    scrollByLine member "MessageNumber", 1
656                    scrollByLine member "MailboxTo", 1
657                    scrollByLine member "MailboxSubject", 1
658                    scrollByLine member "MailboxDate", 1
659                    scrollByLine member "mime", 1
660                    scrollByLine member "Messageread", 1
661                    — GET NUMBER USED TO CORRECT FOR DISCREPANCY
662                    BETWEEN
663                    — THE MOUSELINE AND THE LINEPOSTOLOCV
```

Appendix A - Mailbox Displayer Code - Page 14

```
664                     — THE MOUSELINE GIVES LINE WITHIN FIELD TOTAL
665                     — THE LINEPOSTOLOCV USES LINE OF FIELD ON SCREEN
666                     set mbxG_subtractLine = mbxG_subtractLine - 1
667                     set numberOfIcons = the lineCount of member "MailboxTo" + 40
668                     set amountOfMail = the lineCount of member "MailboxTo"
669                     — put "linecount:" & the lineCount of member "MailboxTo"
670                     — put "subtractline:" & mbxG_subtractLine
671                     repeat with i = 40 to numberOfIcons
672                             if mbxG_subtractLine >= - amountOfMail + 1 then
673                                     set the locV of sprite i = the locV of sprite i - 15
674                                     if the locV of sprite i <105 then
675                                             set the visible of sprite i = FALSE
676                                     else
677                                             set the visible of sprite i = TRUE
678                                     end if
679                             else
680                                     nothing
681                             end if
682                     end repeat
683
684                     if mbxG_subtractLine < - amountOfMail + 1 then
685                             set mbxG_subtractLine = - amountOfMail + 1
686                     end if
687
688                     — MOVE HIGHLIGHT WITH LINE, MOVING HIGHLIGHT
689                     — OFF SCREEN WHEN LINE MOVES OFF SCREEN
690
691                     set whichHighlight = mbxG_whichLine + mbxG_subtractLine
692                     if whichHighlight <= 0 or whichHighlight >= 22 then
693                             set the loc of sprite 11 to point (11, -20)
694                     else
695                             set the locV of Sprite 11 to (99 + linePosToLocV(member
696                             "MailboxTo", whichHighlight))
697                     end if
698                     updateStage
699             end repeat
700     end if
701 end
702
703 ————
704
705 on emc_indicateCheckingInternet
706     global mbxG_red
707     global mbxG_blue
708     global mbxG_white
709     global mbxG_black
710
711     if the locH of sprite 4 > 600 then
712             set the loc of sprite 4 = point(223, 4)
713     end if
714     — if the locH of sprite 5 > 600 then
715     —       set the loc of sprite 5 = point(509, 19)
716     — end if
```

Appendix A - Mailbox Displayer Code - Page 15

```
717
718             set colorNow = the forecolor of line 1 of member the member of sprite 4
719
720             case colorNow of
721                     mbxG_black: set colorNext = mbxG_blue — blue
722                     mbxG_blue: set colorNext = mbxG_white — pink
723                     mbxG_white: set colorNext = mbxG_red — red
724                     mbxG_red: set colorNext = mbxG_blue — blue
725             end case
726
727             . set the forecolor of line 1 of member the member of sprite 4 to colorNext
728             updateStage
729
730     end emc_indicateCheckingInternet
731
732     on emc_endIndicateCheckingInternet
733             set the loc of sprite 4 to point(800, 4)
734             set the loc of sprite 5 = point(800, 19)
735             cursor -1
736             updateStage
737     end emc_endIndicateCheckingInternet
738
739     ——— Scripts for the close window button
740
741     on mouseDown
742
743             repeat while the stillDown
744                     if inside(point(the mouseH, the mouseV), the rect of sprite the clickon) then
745                             if the name of member the member of sprite the clickon = "closeWindow"
746                             then
747                                     set the member of sprite the clickon = "closeWindow_down"
748                                     updateStage
749                             end if
750                     else
751                             set the member of sprite the clickon = "closeWindow"
752                             updateStage
753                     end if
754             end repeat
755             set the member of sprite the clickon = "closeWindow"
756             updateStage
757
758     end mouseDown
759
760     on mouseUp
761
762             — Close the window
763             if inside(point(the mouseH, the mouseV), the rect of sprite the clickon) then
764                     — these next to lines are to try and speed up
765                     — the disposal of the mailbox icons on close
766                     — need to check this on slower machine.
767                     hideMailIcons(the lineCount of member "MailboxTo")
```

Appendix A - Mailbox Displayer Code - Page 16

```
768                    go frame "stop"
769                    tell the stage to emh_killComponent(0, "")
770                    set success = the result
771                    if success <> TRUE then
772                            alert("error closing mailbox MIAW")
773                    end if
774            end if
775     end
776
777     on hideMailIcons numberOfIcons
778             repeat with i = 40 to (40 + numberOfIcons)
779                     set the visible of sprite i = FALSE
780             end repeat
781             updateStage
782     end
783
784
785     — script for the open button
786
787     on mouseDown
788
789             repeat while the stillDown
790                     if inside(point(the mouseH, the mouseV), the rect of sprite the clickon) then
791                             if the name of member the member of sprite the clickon = "open" then
792                                     set the member of sprite the clickon = "open_down"
793                                     updateStage
794                             end if
795                     else
796                             set the member of sprite the clickon = "open"
797                             updateStage
798                     end if
799             end repeat
800             set the member of sprite the clickon = "open"
801             updateStage
802     end mouseDown
803
804
```

Appendix A - Mailbox Displayer Code - Page 17

```
805    on mouseUp
806
807            if inside(point(the mouseH, the mouseV), the rect of sprite the clickon) then
808                    global mbxG_whichLine, mbxG_messages
809                    if mbxG_whichLine = 0 then
810                            alert "Select a message by clicking with your mouse."
811                            exit
812                    end if
813                    set maildata = getAt(mbxG_messages, mbxG_whichLine)
814                    tell the stage
815                            emh_openMessage(maildata)
816                    ·end tell
817            end if
818    end
```

Appendix B - Type Updater Code - Page 1

```
1      --- TYPE_UPDATER IMPLEMENTATION
2      ---- Code for a component that maintains message type information for the
3      ---- KidCode electronic mail client.
4      ---- This Director MIAW makes public functions available for calling by other components
5      of KidCode
6
7      --- public functions
8      --- 1. Initialize_TypeTable
9      ---- 2. Install_Type
10     ---- 3. Uninstall_Type
11
12
13
14     ----- private functions ñfor internal use only
15     ----- 1. Write_Typetable_File
16     ----- 2. Read_Typetable_File
17     ---  3. Read_Icon_Files_To_RAM
18     ---- 4.  read_iconFile
19     ---- 5. delete_mimetype
20     ---- 6. insert_mimetype
21     ---- 7. delete_filetype
22     ---- 8. insert_filetype
23
24
25     --- Filename for permanent storage version of TYPETABLE file
26     --- typetable.txt    --default directory is the currentPath directory
27
28
29     --- INITIALIZE_TYPETABLE initializes the data structures used to lookup Mime type
30     icons, attachment filetype icons and message handler MIAWs.
31     --- The SG_Typetable is set up prior to itís use. File attachment information is not looked
32     up until it is used when a message with an attached file is encountered.
33
34     on Initialize_TypeTable
35     global SG_TYPETABLE       --- super global variable shared across different MIAWS for
36     Typetable
37     global SG_ATTACH_TYPETABLE    ---- maintains info for attachment filetypes
38
39     set SG_TYPETABLE = [:]    -- initialize property list for mimetype information
40
41     -- initialize property list for filetype information
42     -- this list will be filled only as messages with attachments are encountered
43     set SG_ATTACH_TYPETABLE = [:]
44     set SG_TYPETABLE = Read_TypeTable_File(the pathname & " typetable.txt")
45
46     if count(SG_TYPETABLE) = 0 then   -- failed to read typetable file
47        alert ("Error: Failed to read the file of MIMEtypes")
48        return (0)
49     end if
50
51     set retVal = Read_Icon_Files_To_RAM()
```

Appendix B - Type Updater Code - Page 2

```
52
53        if retVal = 0 then
54          alert("Error: Failed to load MIME type icons.)
55          return (0)
56        else
57          return(1)
58        end if
59
60        end   --- Initialize_TypeTable
61
62
63
64        --- INSTALL_TYPE is used to install a new MIME type into the system.
65        INSTALL_TYPE takes as input a mimetype (string), a filename of the message handling
66        movie, an filename of the bitmap that contains the mimetype icon and, optionally, a file
67        extension (string). The function adds the information associated with the MIME type
68        (given by the function parameters) into the MIME type table recorded in permanent storage.
69        Here we use the file "typetable.txt" for permanent storage of the MIME type info.
70
71        on Install_Type mimeToInstall, msgHandler_filename, icon_filename, filetype
72        global SG_TYPETABLE      --- information on all installed MIME types
73
74        set DEFAULT_ICONFILE = "defaultIcon.bmp"
75        set SG_TYPETABLE = [:]   -- initialize property list for mimetype information
76
77        ---read the existing MIME type information into RAM
78        set SG_TYPETABLE = Read_TypeTable_File(the pathname & " typetable.txt")
79
80        if count(SG_TYPETABLE) = 0 then  -- failed to read typetable file
81          alert ("Error: Failed to read the file of MIMEtypes")
82          return (0)
83        end if
84
85        ---Check to see if mimetype is already installed
86
87        set mimeProperties = get_mimetype(mimeToInstall)
88
89        if mimeProperties <> 0 then  ---mimetype is already installed
90          set redefineAlert = baMsgBox(theMessage, "KidCode", "YesNoCancel", "Question", 1)
91
92          -- the alert function should not save the message, only do the alert
93          case redefineAlert of
94              "No": return 0
95              "Cancel": return ñ1
96              otherwise:   nothing -- continue
97          end case
98        end if
99
100       --- Define the new mimetype
101
102       if verifyMessageHandler(msgHandler_filename) = 0 then  --something wrong with
```

Appendix B - Type Updater Code - Page 3

```
103         program file
104           alert("Error: invalid message handler program" && msgHandler_filename)
105           return(0)
106         end if
107
108         insert_msgHandler(SG_TYPETABLE, mimeToInstall, msgHandler_filename)
109
110         if verifyIconImage(icon_filename) = 0 then   --something wrong with icon file
111           alert("Error: invalid icon file" && msgHandler_filename ". Using default icon.")
112           insert_iconFileName(SG_TYPETABLE, mimeToInstall, DEFAULT_ICONFILE)
113         else
114           insert_iconFileName(SG_TYPETABLE, mimeToInstall, icon_filename)
115         end if
116
117         if filetype <>"" then
118           insert_fileytype(mimeToInstall, filetype)
119           writeTypeToRegistry(mimeToInstall, filetype)
120         end if
121
122         set retVal = write_TypeTable_File()
123         if retVal = 0 then
124         alert("Error writing typetable to file." && mimeToInstall && "not installed.")
125         return(0)
126         else return(1)
127
128         end   --- Install_Type
129
130
131         ----- UNINSTALL_TYPE removes a mimetype and it's properties from both the file and
132         the global variable SG_TYPETABLE
133
134         on unInstall_Type  mimeType
135         global SG_TYPETABLE        --- information on all installed MIME types
136
137         set SG_TYPETABLE = [:]   -- initialize property list for mimetype information
138
139         ---read the existing MIME type information into RAM
140         set SG_TYPETABLE = Read_TypeTable_File(the pathname & " typetable.txt")
141
142         if count(SG_TYPETABLE) = 0 then   -- failed to read typetable file
143           alert ("Error: Failed to read the file of MIMEtypes")
144           return (0)
145         end if
146
147         delete_mimetype(mimeType)
148
149         --- write the revised typetable to the file
150         set retVal = write_TypeTable_File()
151         if retVal = 0 then
152         alert("Error." && mimeToInstall && "could not be uninstalled. Typetable file write
153         error.")
```

Appendix B - Type Updater Code - Page 4

```
154     return(0)
155     else return(1)
156
157     end unInstall_Type
158
159     --- WRITE_TYPETABLE_FILE writes the information in SG_TYPETABLE to the
160     typetable file on disk. This file stores properties associated with each mimetype.
161     ---- SG_TYPETABLE is a property list that contains a list of mimetypes.
162
163     on Write_Typetable_File
164     global SG_TYPETABLE      --- super global variable shared across different MIAWS
165     set fileName = the pathname & "typetable.txt"
166     set bkupFileName = the pathname & "typetable.bak"
167
168     if count( SG_TYPETABLE) = 0 then    -- no mimetypes defined
169             alert("Error. No mimetype data to write.)
170     return(0)
171     end if
172
173     --- create backup for typetable file
174     copyFile(filename, bkFileName)
175
176     -- start up Fileio Xtra
177     set mFile = new(xtra "fileio")
178
179     set retVal = deleteFile(mFile, filename)    -- delete old version before rewriting
180     set retVal = createFile(mFile, filename)
181     if retVal = 0 then
182             alert("Error updating typetable file.")
183             renameFile(bkFileName, filename)
184             return(0)
185     end if
186
187     openFile(mFile, fileName, 2) -- open for write access
188     setPosition(mFile, 0)
189
190     --- write the data into the file
191     set i= 1
192     set mimeType = getAt(SG_TYPETABLE, i)
193     repeat while mimeType <> 0
194             set dataToWrite = mimetype
195             put " " & get_filetype(mimetype) into dataToWrite
196             put " " & get_iconFileName(mimetype) into dataToWrite
197     put " " & get_MsgHandler(mimetype) into dataToWrite
198     writeline(mFile, dataToWrite)
199     set i= i+1
200     set mimeType = getAt(SG_TYPETABLE, i)
201     end repeat
202
203     closeFile(mFile)
204     set retVal = deleteFile(mFile, bkFileName)    -- delete backup file
```

Appendix B - Type Updater Code - Page 5

```
205         return(0)
206       end   Write_TypeTable_File
207       --- READ_TYPETABLE_FILE reads the typetable file
208       ---- and creates a data structure in memory, SG_TYPETABLE
209       ---- SG_TYPETABLE is a property list that contains a list of mimetypes
210
211       When the function returns, the global property list data structure, SG_TYPETABLE,
212       contains an entry for each mimetype. Along with the pathName for the message handling
213       movie and the IconFile. Later the cast member number for the icon in RAM will be added
214       to the datastructure. For now these are all set to 0. This data structure looks like,
215       [ "text/plain": ["txt",  0, "C:\KidCode\text.gif", "C:\KidCode\text.dxr"], "x-
216       application/grid": ["",  0, "C:\KidCode\grid.gif", "C:\KidCode\grid.dxr"]]
217
218       on Read_TypeTable_File
219       global SG_TYPETABLE         --- super global variable shared across different MIAWS
220       set fileName = the pathname & "typetable.txt"
221
222       set SG_TYPETABLE  = [:]   -- initialize property list for mimetypes
223
224       -- start up Fileio Xtra
225         set mFile = new(xtra "fileio")
226         openFile(mFile, fileName, 1) -- open for read only access
227         set status = status(mFile)
228
229         if status <> 0 then
230           alert("Error. Could not open mimetype table: " & error(mFile, status))
231           closeFile(mFile) -- just to be safe
232           return FALSE
233         end if
234
235       setPosition(mFile, 0)
236
237       -- Lingo canít read one line at a time so simulate this by reading the entire file into the
238       string, str
239         set str = readFile(mFile)
240
241         set nTypes = the number of lines in str
242         repeat with j = 1 to nTypes
243             set mimetype = word 1 of line j
244             insert_mimetype(mimetype)
245             insert_filetype(mimetype, word 2 of line j)
246             insert_iconFileName(mimetype, word 3 of line j)
247             insert_msgHandler(mimetype, word 4 of line j)
248         end repeat
249
250         closeFile(mFile)
251
252       end   Read_TypeTable_File
253
254
255       on Read_Icon_Files_To_RAM
```

Appendix B - Type Updater Code - Page 6

```
256     global SG_TYPETABLE
257     global SG_DEFAULT_ICON_PTR = 1000
258
259     if count( SG_TYPETABLE) = 0 then      -- no mimetypes defined
260             alert("Error. No mimetype data. Can't load icons.)
261     return(0)
262     end if
263
264     ---load the default icon
265     importFileInto(member SG_DEFAULT_ICON_PTR, the pathname & "defaulticon.gif")
266
267     --- cycle through the mimetypes loading icons
268     set castNum = SG_DEFAULT_ICON_PTR + 1    --first icon immediately follows the
269     default
270     set i= 1
271     set mimeType = getAt(SG_TYPETABLE, i)
272     repeat while mimeType <> 0
273             set iconFile = get_iconFileName(SG_TYPETABLE, mimetype)
274             if icon ="" then  --- icon not defined use default
275                     set iconPtr = SG_DEFAULT_ICON_PTR
276             else
277     set iconPtr = read_IconFile(iconFile, castNum )
278     if iconPtr > 0 then
279             set castNum = castNum + 1
280     else set iconPtr = SG_DEFAULT_ICON_PTR
281             end if
282
283             insert_iconPtr(mimetype, iconPtr)
284     set i= i+1
285     set mimeType = getAt(SG_TYPETABLE, i)
286     end repeat
287
288     return(1)
289
290     end Read_Icon_Files_To_RAM
291
292
293
294     --- READ_ICONFILE loads a single icon bitmap into RAM
295     on read_IconFile filename, castMemberNum
296     set retVal = importFileInto(member castNum, iconFile)
297     return (retVal)
298     end read_IconFile
299     --- Data Access Functions for MIMETYPE info
300     --- Data is stored in the property list SG_TYPETABLE with the following structure:
301     --- mimetype: properties
302     --- where mimetype is a string, e.g. "text/plain"
303     --- and properties is a list with the following elements:
304     ----    [ filetype, iconPtr, iconFilename, msgHandler_FileName
305     ---- e.g. SG_TYPETABLE =
306     ----    [ "text/plain": ["txt", 0, "C:\KidCode\text.gif", "C:\KidCode\text.dxr"],
```

Appendix B - Type Updater Code - Page 7

```
307         ----    "x-application/grid": ["", 0, "C:\KidCode\grid.gif", "C:\KidCode\grid.dxr"]]
308
309         on get_mimetype mimetype
310         global SG_TYPETABLE
311         return( getProp(SG_TYPETABLE, mimetype) )
312         end
313
314         on get_filetype mimetype
315         global SG_TYPETABLE
316         set theProperties = getProp(SG_TYPETABLE, mimetype)
317         return( getAt(theProperties, 1) )
318         end
319
320         on get_iconPtr mimetype
321         global SG_TYPETABLE
322         set theProperties = getProp(SG_TYPETABLE, mimetype)
323         return( getAt(theProperties, 2) )
324         end
325
326         on get_iconFileName mimetype
327         global SG_TYPETABLE
328         set theProperties = getProp(SG_TYPETABLE, mimetype)
329         return( getAt(theProperties, 3) )
330         end
331
332         on get_msgHandler mimetype
333         global SG_TYPETABLE
334         set theProperties = getProp(SG_TYPETABLE, mimetype)
335         return( getAt(theProperties, 4) )
336         end
337
338         on insert_mimetype mimetype
339         global SG_TYPETABLE
340         addProp(SG_TYPETABLE, mimetype)
341         end
342
343         on insert_filetype mimetype, filetype
344         global SG_TYPETABLE
345         set theProperties = getProp(SG_TYPETABLE, mimetype)
346                 add(theProperties, filetype)
347                 setProp(SG_TYPETABLE, mimetype, theProperties)
348         end
349
350         on insert_iconPtr mimetype, iconPtr
351         global SG_TYPETABLE
352         set theProperties = getProp(SG_TYPETABLE, mimetype)
353                 add(theProperties, iconPtr)
354                 setProp(SG_TYPETABLE, mimetype, theProperties)
355         end
356
357         on insert_iconFileName mimetype, iconFilename
```

Appendix B - Type Updater Code - Page 8

```
358         global SG_TYPETABLE
359         set theProperties = getProp(SG_TYPETABLE, mimetype)
360                 add(theProperties, iconFilename)
361                 setProp(SG_TYPETABLE, mimetype, theProperties)
362         end
363
364         on insert_msgHandler mimetype
365         global SG_TYPETABLE
366         set theProperties = getProp(SG_TYPETABLE, mimetype)
367                 add(theProperties, msgHandler)
368                 setProp(SG_TYPETABLE, mimetype, theProperties)
369         end
370
371
372         on delete_mimetype mimetype
373         global SG_TYPETABLE
374         deleteProp(SG_TYPETABLE, mimetype)
375         end
376
377         on delete_filetype mimetype
378         global SG_TYPETABLE
379         set properties = getProp(SG_TYPETABLE, mimetype)
380                 setAt(properties, 1,"")
381                 setProp(SG_TYPETABLE, mimetype, properties)
382         end
383
384         on delete_icon mimetype
385         global SG_TYPETABLE
386         set properties = getProp(SG_TYPETABLE, mimetype)
387                 setAt(properties, 2, 0)
388                 setProp(SG_TYPETABLE, mimetype, properties)
389         end
390
391         on delete_iconFileName mimetype
392         global SG_TYPETABLE
393         set properties = getProp(SG_TYPETABLE, mimetype)
394                 setAt(properties, 3,"")
395                 setProp(SG_TYPETABLE, mimetype, properties)
396         end
397
398         on delete_msgHandler mimetype
399         global SG_TYPETABLE
400         set properties = getProp(SG_TYPETABLE, mimetype)
401                 setAt(properties, 4,"")
402                 setProp(SG_TYPETABLE, mimetype, properties)
403         end
```

What is claimed is:

1. Electronic mail client software for use with a display device, comprising:
   a) mailbox displayer means for displaying the contents of a mailbox as a scrollable list on the display device wherein each item of mail is listed with a plurality of properties, said properties selected from the group consisting of subject, sender's name, and date sent;
   b) association means for associating a plurality of mime types with a plurality of icon images, wherein
   said mailbox displayer means includes means for determining the mime type of at least some items of mail in the mailbox, means for reading said association means, and means for displaying in the scrollable list an icon image as a property associated with each of said at least some items of mail, said icon image for each of said at least some items of mail being selected from said association means according to the mime type for each of said at least some items of mail.

2. Electronic mail client software according to claim 1, further comprising:
   c) type updater means for updating said association means to include additional mime types and additional icon images.

3. Electronic mail client software according to claim 1, further comprising:
   c) a plurality of icon images, each having a filename, wherein
   said association means is a data structure associating each of at least some mime types with the filenames of an icon image.

4. Electronic mail client software according to claim 1, wherein:
   said association means includes means for associating mime types with programs, and
   wherein some mimetypes are not associated with icon images but are associated with programs.

5. Electronic mail client software according to claim 2, wherein:
   said type updater means is responsive to user input.

6. Electronic mail client software according to claim 3, wherein:
   at least some of said plurality of images are scalable.

7. Electronic mail client software according to claim 1, wherein:
   said electronic mail client software is designed to be used with an operating system which maintains a registry of icons, and
   said association means associates at least some mime types with icons selected from said registry of icons.

8. Electronic mail client software according to claim 1, further comprising:
   c) icon recovery means for reading graphical icon information contained in an email or email attachment, wherein
   said association means associates a mime type with an icon recovered by said icon recovery means if no other icon is found.

9. Electronic mail client software according to claim 2, wherein:
   said type updater means is manually operable by a user of said electronic mail client software.

10. Electronic mail client software according to claim 2, wherein:
   said type updater means automatically installs a new icon image according to an event selected from the group consisting of
   a new application or component is installed which is capable of authoring/reading a new mime type,
   a new mime type is encountered in a received mail message, and
   a regularly scheduled event causes said type updater to check a server for new icons.

11. A method of displaying a list of the contents of an electronic mail box on a display device, comprising:
   a) displaying the contents of the mailbox as a scrollable list on the display device wherein each item of mail is listed with a plurality of properties, said properties selected from the group consisting of subject, sender's name, and date sent;
   b) determining the mime type of at least some items of mail in the mailbox;
   c) displaying in the scrollable list an icon image as a property associated with each of said at least some items of mail, said icon image for each of said at least some items of mail being selected according to the mime type for each of said at least some items of mail.

12. A method according to claim 11, further comprising:
   d) associating mime types with programs;
   e) executing a program associated with a mime type when a mail item of the mime type is opened.

13. A method according to claim 11, wherein:
   at least some of said icon images are scalable.

14. A method according to claim 11, wherein:
   said step of displaying includes selecting at least some icons from a central registry of icons.

15. A method according to claim 11, wherein:
   said step of displaying includes reading graphical icon information contained in an email or email attachment.

16. A method according to claim 11, further comprising:
   d) maintaining a store of graphical icons for use when performing said step of displaying.

17. A method according to claim 16, further comprising:
   e) automatically installing a new icon image in said store of graphical icons in response to an event selected from the group consisting of
   when a new application or component is installed which is capable of authoring/reading a new mime type,
   when a new mime type is encountered in a received mail message, and
   when a regularly scheduled event causes said type updater to check a server for new icons.

18. Electronic mail client software for use with a display device, comprising:
   a) mailbox displayer means for displaying the contents of a mailbox as a scrollable list on the display device wherein each item of mail is listed with a plurality of properties, said properties selected from the group consisting of subject, sender's name, and date sent; and
   b) association means for associating a plurality of mime types with a plurality of icon images, wherein
   said mailbox displayer means includes means for determining the mime type of an attachment to at least some items of mail in the mailbox, means for reading said association means, and means for displaying in the scrollable list an icon image as a property associated with each of said at least some items of mail, said icon image for each of said at least some items of mail being selected from said association means according to the mime type for the attachment to each of said at least some items of mail.

19. Electronic mail client software according to claim 18, wherein:

said association means includes means for associating mime types with programs, and wherein some mime types are not associated with icon images but are associated with programs.

20. Electronic mail client software according to claim 18, wherein:

said electronic mail client software is designed to be used with an operating system which maintains a registry of icons, and said association means associates at least some mime types with icons selected from said registry of icons.

* * * * *